(12) United States Patent
Tomii

(10) Patent No.: US 6,885,901 B2
(45) Date of Patent: Apr. 26, 2005

(54) LSI MANUFACTURING SUPPORT SERVER, LSI MANUFACTURING SUPPORT METHOD, AND LSI MANUFACTURING SUPPORT PROGRAM

(75) Inventor: Kazuo Tomii, Kanagawa-ken (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 10/234,485

(22) Filed: Sep. 3, 2002

(65) Prior Publication Data

US 2003/0055520 A1 Mar. 20, 2003

(30) Foreign Application Priority Data

Sep. 3, 2001 (JP) ..................................... P2001-266379

(51) Int. Cl.[7] .......................... G06F 13/00; G06F 19/00
(52) U.S. Cl. ........................... 700/97; 700/100; 705/29; 709/223
(58) Field of Search .............................. 700/90, 95, 97, 700/107, 99, 100; 705/29; 709/223, 238

(56) References Cited

U.S. PATENT DOCUMENTS 6,157,947 A   12/2000   Watanabe et al.
6,507,944 B1 * 1/2003   Kikuchi et al. ................ 716/21

FOREIGN PATENT DOCUMENTS

JP     2001-290844      10/2001

* cited by examiner

Primary Examiner—Jayprakash N. Gandhi
(74) Attorney, Agent, or Firm—Gray Cary Ware & Freidenrich LLP

(57) ABSTRACT

A server for supporting LSI manufacturing is used within an LSI manufacturing support system including: a communication line, an LSI manufacturing support server connected to that communication line, IP developer terminals, LSI developer terminals, and an IP management storage, IP development schedule storage and project information storage connected to that LSI manufacturing support server. The server includes an IP management unit for managing management information of IP, which is to become structural element of LSI, stored in the IP management storage; and an IP scheduling unit for processing information regarding an IP development schedule stored in the IP development schedule storage; a project processing unit for processing information regarding an LSI development project stored in the project information storage; and a matrix processing unit for evaluating availability of the IP using relative temporal relationship of the IP development schedule and the project information and representing evaluation results as a matrix.

20 Claims, 40 Drawing Sheets

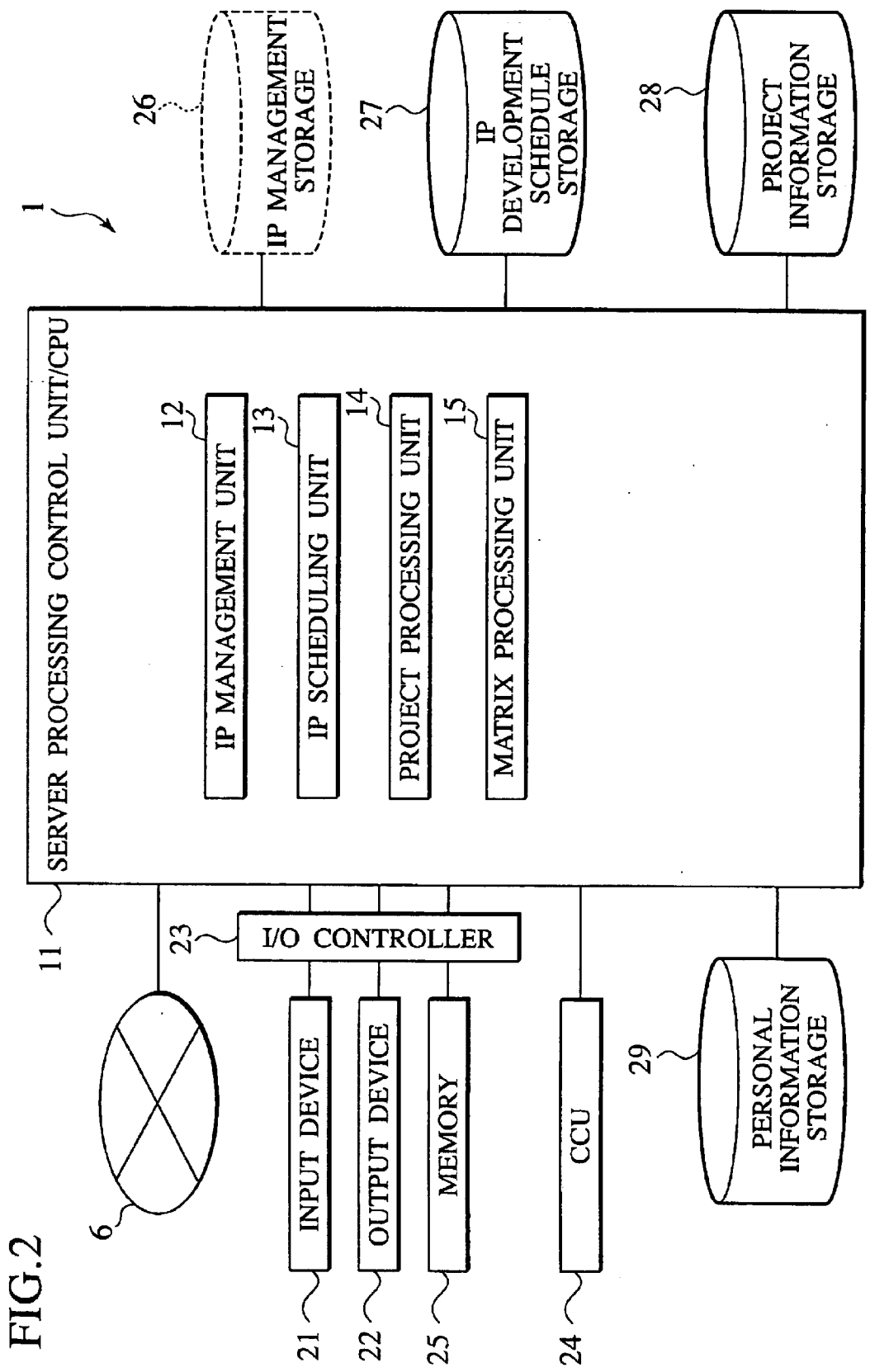

FIG.5

IP LIST

33 — DOWNLOAD IN CSV FORMAT

| ID | IP NAME | TECH. | RELEASE NAME | DESCRIPTION | SCHEDULE ||||||
|---|---|---|---|---|---|---|---|---|---|---|
| | | | | | DESIGN | | TEG | | EVAL | |
| | | | | | ORIGINAL / PREVIOUS / CURRENT | COMMENT | ORIGINAL / PREVIOUS / CURRENT | COMMENT | ORIGINAL / PREVIOUS / CURRENT | COMMENT |
| 00010 | IP1 | TC260 | ip1a | xxx xxx | (221200) 231000 / (221200) 231000 / (221200) 231000 | xxx xxx | (221200) / (221200) / (221200) | xxx xxx | (221200) 010201 / (221200) 010201 / (221200) 010201 | xxx xxx |
| 00011 | IP2 | TC260 | ip2a | xxx xxx | (221200) 231000 / (221200) 231000 / (221200) 231000 | xxx xxx | (221200) 010101 / (221200) 010101 / (221200) 010101 | xxx xxx | (221200) 010301 / (221200) 010301 / (221200) 010301 | xxx xxx |
| 00012 | IP3 | TC260 | ip3a | xxx xxx | (221200) 111100 / (221200) 111100 / (221200) 111100 | xxx xxx | (221200) 271100 / (221200) 271100 / (221200) 271100 | xxx xxx | (221200) 151200 / (221200) 151200 / (221200) 151200 | xxx xxx |
| | | | | | | | | | | |

32a: rows for 00010

FIG.9

PROJECT LIST

DOWNLOAD IN CSV FORMAT ~33

Schedule data, LastUpdate Format DDMMYY

| ID | CUSTOMER | PROJECT | TECH. | DESIGN CENTER | PROJECT MANAGER | PRIORITY | SCHEDULE |||| BUSINESS ISSUE | ASP | QTY/PEAK(PCS) | PAV | STATUS | CONFIDENCE LEVEL | LAST UPDATE | EDIT | DELETE |
|---|---|---|---|---|---|---|---|---|---|---|---|---|---|---|---|---|---|---|---|
| | | | | | | | DESIGN | TAPE_OUT | KS | MP | | | | | | | | | |
| 00006 | CUSTOMER1 | PROJECT1 | TC260 | West | PROJECT1 | | 010700 | 011200 | 010201 | 010601 | | | | | LOST | | 170101 | EDIT | DELETE |
| 00007 | CUSTOMER2 | PROJECT2 | TC260 | Central | PROJECT2 | | 010900 | 010201 | 010401 | 011201 | | | | | LOST | | 170101 | EDIT | DELETE |
| 00008 | CUSTOMER3 | PROJECT3 | TC260 | West | PROJECT3 | | 011200 | 010601 | 010801 | 011201 | | | | | RFI | | 170101 | EDIT | DELETE |
| 00009 | CUSTOMER4 | PROJECT4 | TC260 | East | PROJECT4 | | 011200 | 010601 | 010301 | 010102 | | | | | RFI | | 170101 | EDIT | DELETE |
| 000010 | CUSTOMER5 | PROJECT5 | TC260 | West | PROJECT5 | | 010700 | 010301 | 010501 | 011201 | | | | | RFQ | | 170101 | EDIT | DELETE |
| 000011 | CUSTOMER6 | PROJECT6 | TC260 | Central | PROJECT6 | | 011200 | 010301 | 010501 | 011201 | | | | | RFI | | 170101 | EDIT | DELETE |
| 000012 | CUSTOMER7 | PROJECT7 | TC260 | West | PROJECT7 | | 011000 | 030301 | 010501 | 011201 | | | | | RFQ | | 170101 | EDIT | DELETE |
| 000013 | CUSTOMER8 | PROJECT8 | TC260 | West | PROJECT8 | | 011000 | 040301 | 010301 | 010901 | | | | | RFI | | 170101 | EDIT | DELETE |
| 000014 | CUSTOMER9 | PROJECT9 | TC260 | West | PROJECT9 | | 010500 | 110301 | 010101 | 010401 | | | | | WON | | 170101 | EDIT | DELETE |
| 000015 | CUSTOMER10 | PROJECT10 | TC260 | West | PROJECT10 | | 011200 | 130301 | 010601 | 010102 | | | | | RFI | | 170101 | EDIT | DELETE |

ADD NEW PROJECT ~34

Back 35a 35b

INPUT NEW PROJECT DATA

| | |
|---|---|
| CUSTOMER | |
| PROJECT | |
| TECHNOLOGY | TC260 ▼ |
| DESIGN CENTER | |
| PROJECT MANAGER | |
| PRIORITY | |
| DESIGN(DDMMYY) | DD(1-31) ▼ MM(1-12) ▼ YY(1-20) ▼ |
| TAPE_OUT(DDMMYY) | DD(1-31) ▼ MM(1-12) ▼ YY(1-20) ▼ |
| KS(DDMMYY) | DD(1-31) ▼ MM(1-12) ▼ YY(1-20) ▼ |
| MP(DDMMYY) | DD(1-31) ▼ MM(1-12) ▼ YY(1-20) ▼ |
| BUSINESS ISSUE | |
| ASP($) | |
| QTY/PEAK(PCS) | |
| PAV | |
| STATUS | ▼ |
| CONFIDENCE LEVEL | |
| LAST UPDATE | |

OK ~36

121

91  SELECT IP IN USE

| CHECK | IP NAME | TECH. | RELEASE NAME | SCHEDULE | | |
|---|---|---|---|---|---|---|
| | | | | (LAST UPDATE) DESIGN DATE | (LAST UPDATE) TEG DATE | (LAST UPDATE) EVAL DATE |
| ☐ | IP1 | TC260 | ip1a | (221200) 231000 | (221200) | (221200) 010201 |
| ☐ | IP2 | TC260 | ip2a | (221200) 231000 | (221200) 010101 | (221200) 010301 |
| ☐ | IP3 | TC260 | ip3a | (221200) 111100 | (221200) 271100 | (221200) 151200 |
| ☐ | IP4 | TC260 | ip4 | (281200) 310101 | (281200) 280301 | (251200) 280501 |
| ☐ | IP5 | TC260 | ip5a | (251200) 060900 | (251200) 301100 | (251200) 300101 |
| ☐ | IP6 | TC260 | ip6 | (261200) 231000 | (261200) 161200 | (251200) 010201 |

BACK ~122

INPUT UPDATE INFORMATION

| | |
|---|---|
| CUSTOMER | CUSTOMER1 |
| PROJECT | PROJECT1 |
| TECHNOLOGY | TC260 ▼ |
| DESIGN CENTER | West |
| PROJECT MANAGER | PROJECT_MANAGER1 |
| PRIORITY | ***** |
| DESIGN | 010700 DD(1-31) 01▼ MM(1-12) 07▼ YY(1-20) 00▼ |
| TAPE_OUT | 011200 DD(1-31) 01▼ MM(1-12) 12▼ YY(1-20) 00▼ |
| KS | 010201 DD(1-31) 01▼ MM(1-12) 02▼ YY(1-20) 01▼ |
| MP | 010601 DD(1-31) 01▼ MM(1-12) 06▼ YY(1-20) 01▼ |
| BUSINESS ISSUE | ***** |
| ASP($) | ***** |
| QTY/PEAK | ***** |
| PAV | ***** |
| STATUS | *** ▼ |
| CONFIDENCE LEVEL | ***** |
| LAST UPDATE | 070101 |

[OK] ~36

91  SELECT IP IN USE

| CHECK 91a | IP NAME | TECH. | RELEASE NAME | SCHEDULE (LAST UPDATE) DESIGN DATE | (LAST UPDATE) TEG DATE | (LAST UPDATE) EVAL DATE |
|---|---|---|---|---|---|---|
| ☐ | IP1 | TC260 | ip1a | (221200) 231000 | (221200) | (221200) 010201 |
| ☐ | IP2 | TC260 | ip2a | (221200) 231000 | (221200) 010101 | (221200) 010301 |
| ☐ | IP3 | TC260 | ip3a | (221200) 111100 | (221200) 271100 | (221200) 151200 |
| ☑ | IP4 | TC260 | ip4 | (281200) 310101 | (281200) 280301 | (251200) 280501 |
| ☑ | IP5 | TC260 | ip5a | (251200) 060900 | (251200) 301100 | (251200) 300101 |
| ☐ | IP6 | TC260 | ip6 | (261200) 231000 | (261200) 161200 | (251200) 010201 |

91b

BACK

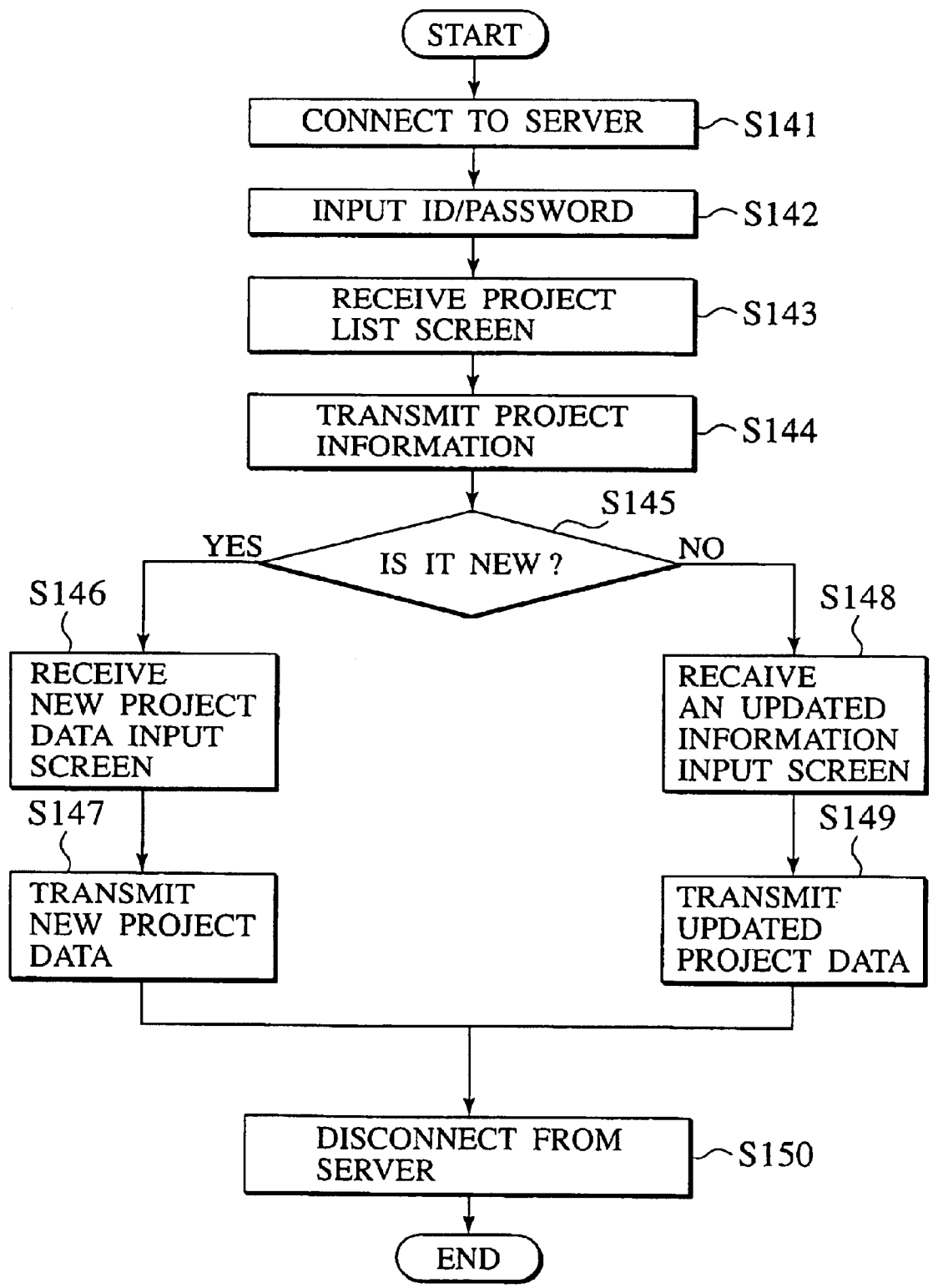

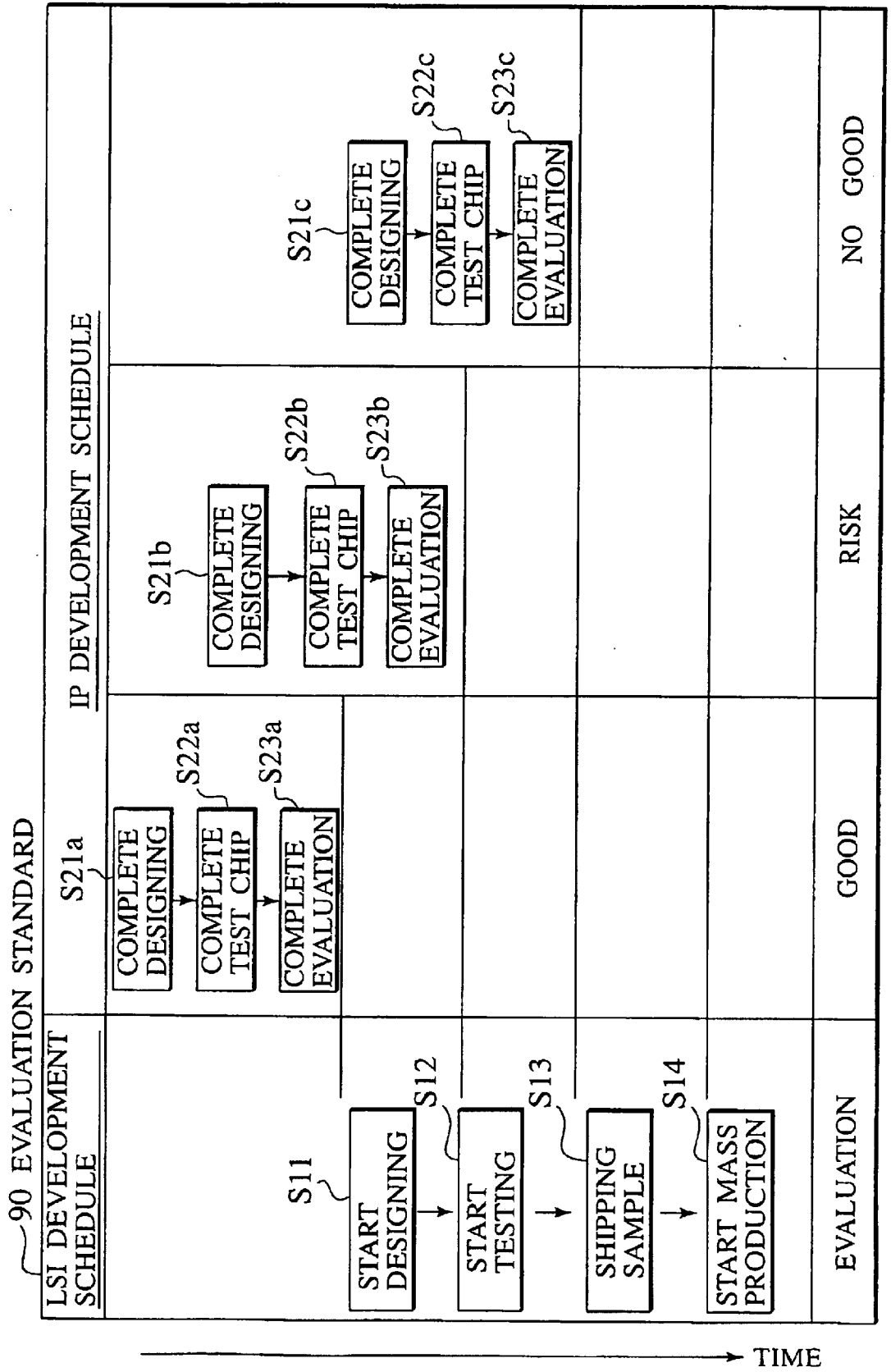

FIG. 20

MATRIX LIST — 134

33 — DOWNLOAD THIS LIST IN CSV FORMAT

THE POINT OF VIEW OF THE TABLE MATRIX
IF EVAL(DDMMYY) OF IP IS BEFORE DESIGN(DDMMYY)···OK
IF EVAL(DDMMYY) OF IP IS BEFORE TAPEOUT(DDMMYY)···RISK
IF EVAL(DDMMYY) OF IP IS AFTER TAPEOUT(DDMMYY)···NO GOOD

| CUSTOMER | PROJECT | | IP1 (010100) | IP2 (010100) | IP3 (070201) | IP4 (010101) | IP5 (010100) |
|---|---|---|---|---|---|---|---|
| DESIGN CENTER | PROJECT MANAGER | UPDATE (DDMMYY) | | | | | |
| DESIGN (DDMMYY) | TAPEOUT (DDMMYY) | | | | | | |
| CUSTOMER1 | PROJECT1 | | – | – | NO GOOD (070201) | NO GOOD (010101) | – |
| West | PROJECT MANAGER1 | 170101 | | | | | |
| 010700 | 011200 | | | | | | |
| CUSTOMER2 | PROJECT2 | | – | – | NO GOOD (070201) | RISK (010101) | – |
| Central | PROJECT MANAGER2 | 170101 | | | | | |
| 010900 | 010201 | | | | | | |
| CUSTOMER3 | PROJECT3 | | – | RISK (010100) | RISK (070201) | – | – |
| West | PROJECT MANAGER3 | 170101 | | | | | |
| 011200 | 010601 | | | | | | |
| CUSTOMER4 | PROJECT4 | | – | – | NO GOOD (070201) | RISK (010101) | – |
| East | PROJECT MANAGER4 | 170101 | | | | | |
| 011200 | 010501 | | | | | | |
| CUSTOMER5 | PROJECT5 | | – | – | NO GOOD (070201) | – | – |
| West | PROJECT MANAGER5 | 170101 | | | | | |
| 010700 | 011200 | | | | | | |
| CUSTOMER6 | PROJECT6 | | – | – | – | – | RISK (010100) |
| Central | PROJECT MANAGER6 | 170101 | | | | | |
| 010700 | 011200 | | | | | | |
| CUSTOMER7 | PROJECT7 | | – | RISK (010100) | NO GOOD (070201) | – | – |
| West | PROJECT MANAGER7 | 170101 | | | | | |
| 010700 | 011200 | | | | | | |
| CUSTOMER8 | PROJECT8 | | – | RISK (010100) | – | – | RISK (010100) |
| West | PROJECT MANAGER8 | 170101 | | | | | |
| 010700 | 011200 | | | | | | |
| CUSTOMER9 | PROJECT9 | | – | – | – | RISK (010101) | – |
| West | PROJECT MANAGER9 | 170101 | | | | | |
| 010700 | 011200 | | | | | | |

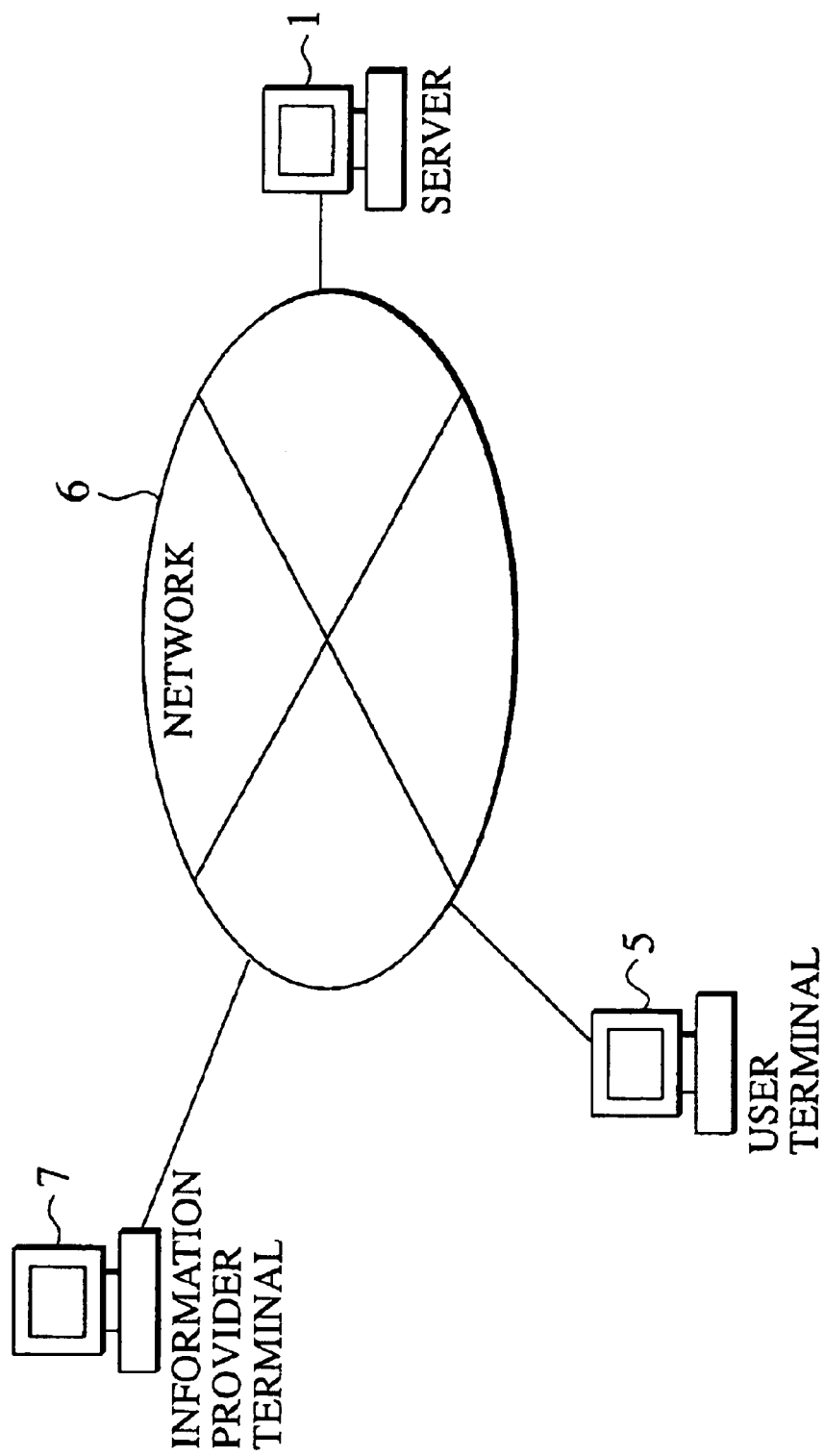

FIG.26

| IP INFORMATION SCREEN | |
|---|---|
| IP NAME | TOMI-TEST |
| RELEASE NAME | not specified |
| DESCRIPTION | test data by kazuo tomii. You can test how the request based download works. PLS request me. |
| GLASSIFICATION | /12_Other_Technology |
| CONTACT INFORMATION | |
| USER NAME | Kazuo Tomii |
| CONTACT INFORMATION | Kazuo Tomii ttt @ somewhere.com<br>TEL.123-456-7890 |

SLOW DETAILS (43)   DOWNLOAD REQUEST (42)

DOWNLOAD REQUEST

| | |
|---|---|
| IP NAME | tomii_test_data |
| RELEASE NAME | |
| DESCRIPTION | this is test data |
| REQUEST STATE | Entered |
| COMMENT  44 | Request From: Tamaki Saito, (IP-Kai)<br>TEL/FAX: 234-567-8901<br>Emai: mmm @ somewhere.com<br>Customer/Project/P/N: FUMITSU/Project X/TC260C9999AF<br>Application: FAX=COPY=LBP<br>Application Engineer: (A-Kai-Ou)<br>Design Engineer: (A-Kai-Ou)<br>Bussiness Issue: SP/300,M130%,Avarage 20kpcs/Month,Total 500kpcs<br>Schedule: 1st S/O 2000/11,2nd S/O 2001/1,ES 2001/3,MP 2001/5 |

SUBMIT
46

FIG.28

CATALOG INFORMATION — 137

IP NAME :

DESCRIPTION :

VOLTAGE :     DESIGN RULE :

FREQUENCY :     LOADING :

DEVELOPMENT SCHEDULE :

PRICING :

SUPPORT CONDITION :

---

DELIVERABLES(DESIGN DATA) — 138

- RTL SOURCE CODE
- DOCUMENT(MANUAL)
- TEST VECTOR

| EDIT REQUEST ||| 
|---|---|---|
| REQUEST ID | DATE SUBMITTED | REQUEST BY |
| 1 | Oct 26 2000 155920 (CMT9) | kazuo tomii/consumer |

IP NAME    test_data_Saito

REQUEST STATE    [ACCEPT ▼]

ACCEPT    Kazuo Tomii    51

HISTORY    Original text by kazuo on Oct 26 2000,15,69,20:

Request From: Tamaki Saito, (IP-Kai)
TEL/FAX: 234-567-8901
Emai: mmm @ somewhere.com Customer/Project/P/N: FUMITSU/Project X/TC260C9999AF
Application: FAX=COPY=LBP
Application Engineer: (A-Kai-Ou)
Design Engineer: (A-Kai-Ou)
Bussiness Issue: SP/300,M130%,Avarage 20kpcs/Month,Total 500kpcs
Schedule: 1st S/O 2000/11,2nd S/O 2001/1,ES 2001/3,MP 2001/5

NOTE    OK

53

[SUBMIT]
56

Your Authorization is Requested.

Request From : XXXXXXXXXXXX
Tel/Fax : 123-456-7890
E-mail : mmm@somewhere.com

70 —

| AUTHORIZATION | IP NAME | RELEASE NAME | DETAILS | | |
|---|---|---|---|---|---|
| ☐ | Axxx | xxxxxx | xxxx | xxxx | |
| ☐ | Bxxx | xxxxxx | xxxx | xxxx | |
| ☐ | Cxxx | xxxxxx | xxxx | xxxx | |

EDIT REQUEST

Your Authorization is Requested.

Request From : XXXXXXXXXXXX
Tel/Fax : 123-456-7890
E-mail : mmm@somewhere.com

70 —
70a —
70b —
70c —

| AUTHORIZATION | IP NAME | RELEASE NAME | DETAILS | | |
|---|---|---|---|---|---|
| ◯ | Axxx | xxxxxx | xxxx | xxxx | |
| ✗ | Bxxx | xxxxxx | xxxx | xxxx | |
| ◯ | Cxxx | xxxxxx | xxxx | xxxx | |

DOWNLOADABLE DESIGN DATA LIST

The following data is available for download.

| SELECT | IP NAME | RELEASE NAME | DETAILS | | |
|--------|---------|--------------|---------|------|------|
| ☐ | Axxx | xxxxxx | xxxx | xxxx | |
| ☐ | Cxxx | xxxxxx | xxxx | xxxx | |

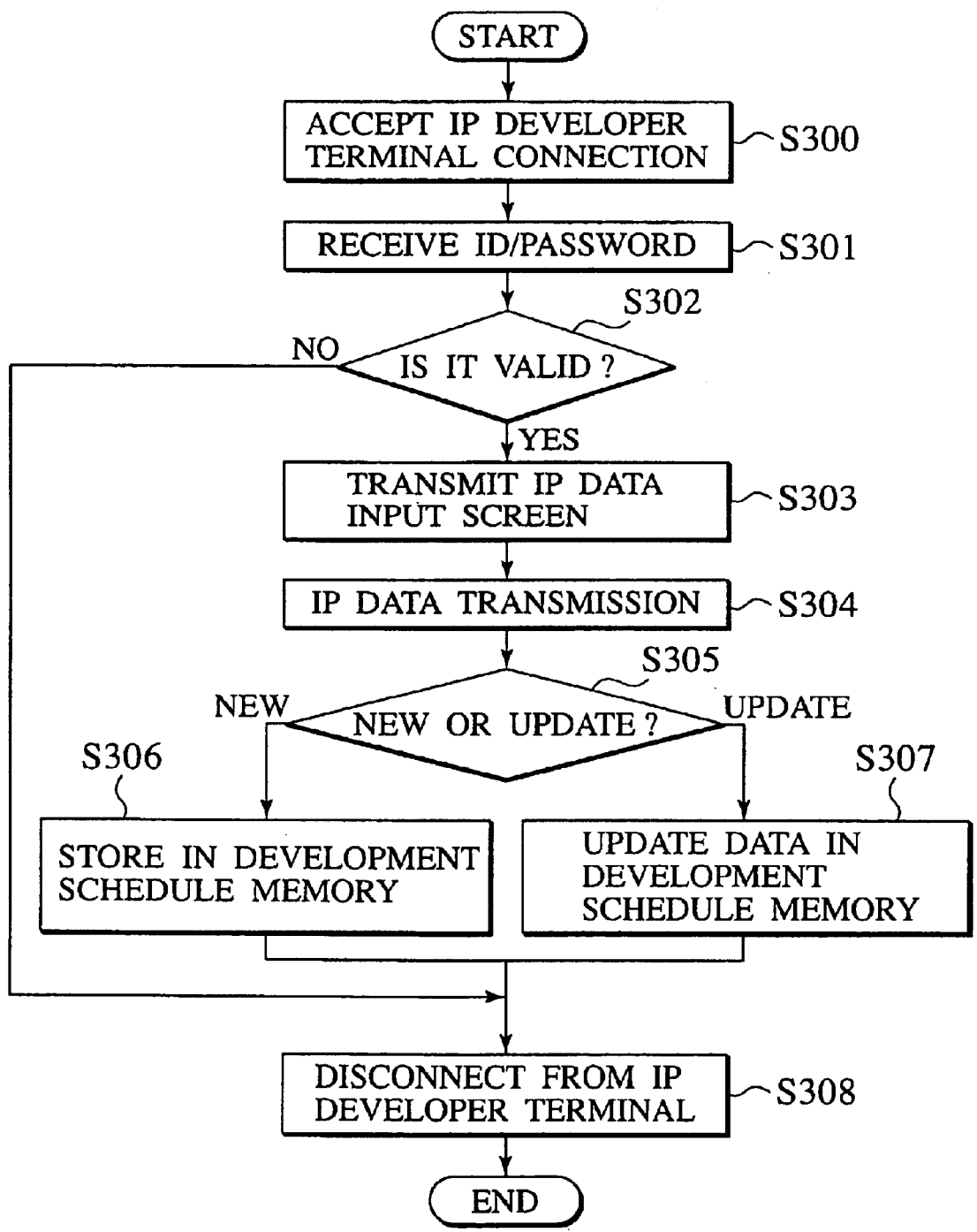

LSI MANUFACTURING SUPPORT SERVER, LSI MANUFACTURING SUPPORT METHOD, AND LSI MANUFACTURING SUPPORT PROGRAM

CROSS REFERENCE TO RELATED APPLICATIONS

This application is based upon and claims the benefit of priority from prior Japanese Patent Application P2001-266379 filed on Sep. 3, 2001; the entire contents of which are incorporated by reference herein.

BACKGROUND OF THE INVENTION

1. Field of the Invention

The present invention relates to a server for supporting large scale integration (LSI) manufacturing, a method for supporting LSI manufacturing, and a computer program product executed on a server for supporting LSI manufacturing, in order to perform development schedule management.

2. Description of the Related Art

Demands have been made for increased design efficiency in the design of system LSI where multiple function blocks of an electronic circuit are integrated upon a piece of silicon chip, including abstraction for logic design description, improvement of Electronics Design Automation (EDA) techniques for design automation, and introduction of computers with higher processing performance. However, in actuality, the fact is that improvements in design efficiency obtained through the development of these techniques cannot keep up with the tremendous increases in integration. Meanwhile, there are increased market demands for a shortened design time period because of contraction in the life of system products in recent years. Accordingly, there are hopes for techniques that attempt to fill in the gap between the increased large scale of LSI and design efficiency through reutilization of previously designed LSI function blocks as design data or "intellectual property (IP)", thereby shortening the LSI design time period and improving productivity. Generally, the design and manufacture of systems on a chip requires hierarchical or portioned approaches to provide reuse. This reuse is often described as the IPs that can be shared and reused. Several forms of IP are available today, such as soft (e.g. hardware description language), firm (e.g. hardware description language with placement information), and hard (e.g. mask layout data).

Methods using this sort of reusable function blocks (or IPs) as components are extremely important for performing highly complex system development within a realistic time period and resources. Accordingly, when manufacturing system LSI, demands are being made for improvement to the LSI design method using reusable electronic circuit function blocks as LSI components and rapid development of IP required for LSI design.

Conventionally, in situations where LSI development and IP development take place simultaneously in parallel, the status of the progression of each development group (or project) has been managed by circulating a spreadsheet, having the respective groups fill in the appropriate items, and holding periodic meetings. In addition, conventionally, IP design data referenced during LSI development has been managed using commercial IP management tools with which users are given unlimited download access to registered IP design data.

The typical life cycle of system LSI is short and there is competition to see who can develop faster under the present situation. However, in conventional situations where, for example, spread sheet is circulated, and each development group successively fills in the status of their respective progression, circulation can require weeks or even a month to complete, leading to problems such as not being able to respond in a timely manner to schedule changes, or the like. Furthermore, since the currently circulated spreadsheet does not always show current conditions in real-time, the fact that proper decisions cannot be made is also a problem.

Moreover, when IP design data is managed using commercial IP management tools, there is a problem with the scheme allowing unlimited downloads without confirmation of technical or business constraints for reusing IP.

SUMMARY OF THE INVENTION

A first features of present invention inheres in a server for use in a system for large scale integration manufacturing, the system includes a communication line, a server connected to the communication line, IP (design data) developer terminals connected to the communication line, LSI developer terminals connected to the communication line, an IP (design data) management storage connected to the communication line, a development schedule storage connected to the server; and a project information storage connected to the server, the server including: an IP (design data) management unit, configured to manage IP (design data) management information stored in the IP (design data) management storage; an IP (design data) scheduling unit, configured to process IP (design data) development schedule stored in the development schedule storage; a project processing unit, configured to process information regarding a LSI development project, stored in the project information storage; and a matrix processing unit, configured to evaluate availability of the IPs (design data) in time span by using a relative temporal relationship between development schedule of the IPs (design data) and the project information, and expressing the evaluation result in a matrix form.

A second features of present invention inheres a server for use in a system for large scale integration manufacturing, the system includes a communication line, a server connected to the communication line, user terminals connected to the communication line, information provider terminals connected to the communication line, and an IP (design data) management storage connected to the server, the server including: an IP (design data) management unit, configured to manage IP (design data) management information stored in the IP (design data) management storage; and a screen generating unit, configured to receive an acknowledgement request for downloading IPs (design data) stored in the IP (design data) management storage from the user terminals, and to transmit availability messages of the IPs (design data) to the information provider terminals.

A third features of present invention inheres in a server for use in a system for large scale integration manufacturing, the system includes a communication line, a server connected to the communication line, IP (design data) developer terminals connected to the communication line, LSI developer terminals connected to the communication line, an IP (design data) management storage connected to the server, and a project information storage connected to the server, the server including: an IP (design data) management unit, configured to manage IP (design data) management information, at least including development schedule of the IP (design data) stored in the IP (design data) management storage; a project processing unit, configured to process information regarding LSI development projects, stored in the project information storage; and a matrix processing unit, configured to evaluate availability of the IP (design data) in time span by using a relative temporal relationship between the development schedule of the IP (design data) and the project information, and expressing the evaluation result in a matrix form.

A fourth features of present invention inheres in a computer implemented method for large scale integration including: retrieving development schedule of an IPs (design data) from a development schedule storage; retrieving projects' schedule data from a project information storage; evaluating availability of the IPs (design data) by using a relative temporal relationship between the retrieved development schedules of the IPs (design data) and the retrieved projects' schedule data; and generating a matrix showing the evaluation result on an intersection of a first and a second axis of the matrix, wherein names of the IPs (design data) corresponding to the development schedule of the IPs (design data) on the first axis and the project schedule data corresponding to the projects' schedule data on the second axis.

A fifth features of present invention inheres in a computer implemented method for large scale integration manufacturing including: storing IPs (design data) in an IP (design data) management storage; receiving a download request for an IP (design data) being stored in the IP (design data) management storage; transmitting the download request to an information provider terminal as a request notification message; receiving an availability message regarding the request notification message from the information provider terminal; transmitting the availability message to an user terminal; and downloading the IP (design data) from the IP (design data) management storage to the user terminal.

A sixth features of present invention inheres in a computer program product for use in a system for large scale integration manufacturing, the system includes a communication line, a server connected to the communication line, LSI developer terminals connected to the communication line, user terminals connected to the communication line, an IP (design data) management storage connected to the communication line, a development schedule storage connected to the server, a project information storage connected to the server, and a storage medium connected to the server, the computer program product including: instructions embodied within the storage medium for retrieving development schedule of the IP (design data) from the development schedule storage; instructions embodied within the storage medium for retrieving project schedule data from the project information storage; instructions embodied within the storage medium for evaluating availability of the IPs (design data) by using a relative temporal relationship between the retrieved development schedules of the IPs (design data) and the retrieved project schedule data; and instructions embodied within the storage medium for displaying and matrixing the evaluation result on an intersection of a first and a second axis of a matrix, wherein IP names corresponding to the development schedules of the IPs (design data) on the first axis and project schedule data corresponding to the project data on the second axis.

A seventh features of present invention inheres in a computer program product for use in a system for large scale integration manufacturing, the system includes a communication line, a server connected to the communication line, an user terminal connected to the communication line, an information provider terminal connected to the communication line; an IP (design data) management storage connected to the server, a development schedule storage connected to the server, a project information storage connected to the server, and a storage medium connected to the server, the computer program product including: instructions embodied within the storage medium for storing IP (design data) in the IP (design data) management storage; instructions embodied within the storage medium for transmitting an IP (design data) information screen regarding specified IPs (design data) corresponding to a search keyword to the user terminal; instructions embodied within the storage medium for transmitting an acknowledgement request for downloading the IP (design data) to the information provider terminal; instructions embodied within the storage medium for displaying a response entry screen corresponding to the acknowledgement request; instructions embodied within the storage medium for transmitting availability message from the information provider terminal to the user terminal; and instructions embodied within the storage medium for downloading the IP (design data) in accordance with a request from the user terminal.

BRIEF DESCRIPTION OF DRAWINGS

FIG. 2 is a block diagram showing the configuration of an LSI manufacturing support server in the LSI manufacturing support system shown in FIG. 1;

FIG. 5 is a display screen example for displaying on a user terminal an IP list screen upon which IP development schedule data is listed that is acquired into IP development schedule storage within the LSI manufacturing support server shown in FIG. 2;

FIG. 9 is a display screen example for displaying on an LSI developer terminal a project list screen according to the first embodiment of the present invention;

FIG. 11 is a display screen example for displaying on an LSI developer terminal a new project data entry screen according to the first embodiment of the present invention;

FIG. 12 is a display screen example for displaying on an LSI developer terminal an updated information input screen according to the first embodiment of the present invention;

FIG. 13 is a flowchart showing the processing sequence of an LSI developer terminal corresponding to FIG. 10 in the case where project schedule data relating to LSI development is registered according to the first embodiment of the present invention;

FIG. 16 is a diagram showing an example of evaluation standards representing the relative temporal relationship when performing matrix display screen according to the first embodiment of the present invention;

FIG. 20 is a display screen example for displaying on a user terminal a matrix screen according to the first embodiment of the present invention;

FIG. 21 is a system block diagram showing the configuration of an LSI manufacturing support system according to a second embodiment of the present invention;

FIG. 26 is a display screen example for displaying on a user terminal an IP information screen according to the second embodiment of the present invention;

FIG. 27 is a display screen example for displaying on a user terminal a request entry screen (download request screen) according to the second embodiment of the present invention;

FIG. 28 is a display screen example for displaying on a user terminal an IP catalog information screen according to the second embodiment of the present invention;

FIG. 32 is a display screen example for displaying on an information provider terminal a response entry screen according to the second embodiment of the present invention;

FIG. 38 is an example of an acknowledgement request e-mail according to a modification of the second embodiment of the present invention;

FIG. 39 is a display screen example for displaying on an information provider terminal a response entry screen according to the modification of the second embodiment of the present invention;

FIG. 40 is an example of a download acceptance e-mail according to a modification of the second embodiment of the present invention;

FIG. 42 is a flow chart for the server on the occasion where an IP developer registers IP management information into an IP development schedule storage when the server does not have an IP management storage.

DETAILED DESCRIPTION OF EMBODIMENTS

Figure 1:
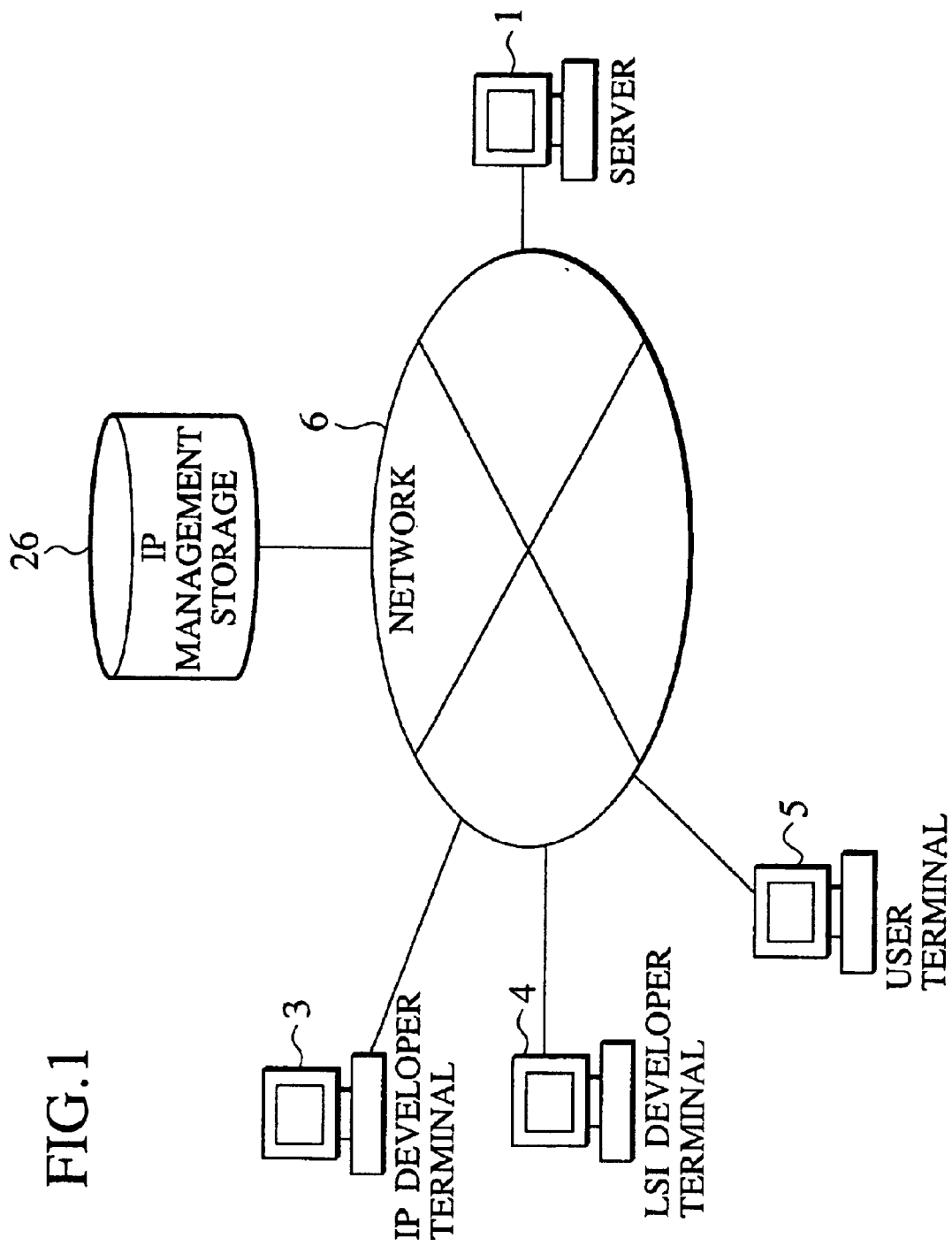
FIG. 1 is a system block diagram showing the configuration of an LSI manufacturing support system according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set fourth such as specific signal values, etc. to provide a thorough understanding of the present invention. However, it will be obvious to those skilled in the art that the present invention may be practiced without such specific details in other instances, well-known circuits have been shown in block diagram form in order not to obscure the present invention in unnecessary detail.

First Embodiment

As shown in FIG. 1, an LSI manufacturing support system according to the first embodiment of the present invention encompasses an LSI manufacturing support server 1, an IP developer terminal (design data developer terminal) 3, an LSI developer terminal 4, a user terminal 5, and a network (communication line) 6 interconnecting each of these. According to the first embodiment of the present invention, a Local Area Network (LAN) is given as the network, however other networks such as the Internet or a dial up network are also allowable.

The server 1 is a computer for collectively managing and providing development information of Intellectual Property (IP), which are used in designing system LSI as components, and LSI development information. The IP developer terminal 3 is a terminal where an IP developer registers IP in the IP management storage (design data management storage) 26 and performs IP development schedule management via the server 1. The LSI developer terminal 4 is a terminal for an LSI developer to input LSI development information into the server 1. The user terminal 5 is a terminal for displaying IP evaluation used in a specific project that is determined by the relative temporal relationship of both the IP development schedule data and the LSI development schedule data from the server 1. For example, let one axis (for example the horizontal axis) be the IP names, and let another axis perpendicular to the horizontal axis (for example the perpendicular axis) be data related to the project (project data), the intersection of the horizontal axis and the perpendicular axis shows evaluation results as a matrix. It should be noted that this user terminal 5 can be the same terminal as the LSI developer terminal 4 or the IP developer terminal 3. The IP developer terminal 3 may be plural. The LSI developer terminal 4 may be plural. The user terminal 5 may also be plural.

A Central Processing Unit (CPU), input device, output device, temporary storage device (main memory), auxiliary storage device, and the like, are respectively provided in each of the server 1, IP developer terminal 3, LSI developer terminal 4, and user terminal 5. In the CPU (server processing control unit) 11 of the server 1, IP management unit (design data management unit) 12, IP scheduling unit (design data scheduling unit) 13, project processing unit 14, matrix processing unit 15 and IP screen generating unit 16 are provided, and online control unit is also provided for parsing messages received from the network 6 and executing the required processing. In addition, a communication control device for transmitting messages received from the network 6 to this online control unit is provided in the CPU 11 of the server 1. Moreover, database management unit is provided in the CPU 11 of the server 1. The data transfer from/to the IP management storage (design data management storage) 26, the IP development schedule storage (development schedule storage) 27, the project information storage 28 and the personal information storage 29 of the FIG. 2 is controlled by this database management unit.

As shown in FIG. 2, an LSI manufacturing support server 1 according to the first embodiment of the present invention embraces an input device 21, an output device 22, an input-output control device 23, a communication control device 24, a main memory (temporary storage device) 25, an IP management storage 26, an IP development schedule storage 27, a project information storage 28, a personal information storage 29, and a server processing and control device (CPU) 11. It should be noted that, as shown in FIG. 1, the IP management storage 26 may be connected either via the network 6 or connected directly to the server processing and control device 11. In addition, the TP management storage 26, IP development schedule storage 27, project information storage 28, and personal information storage 29 may be included in the server 1, or they may be connected as external memories. Alternatively, the IP management storage 26, IP development schedule storage 27, project information storage 28, and personal information storage 29 may be connected via a database server. The input device 21 may be implemented by a keyboard, a mouse, a recognition device such as for Optical Character Recognition (OCR), a graphics input device such as an image scanner, or a special-purpose input device such as a voice recognition device. The output device 22 may be implemented by a display device such as a liquid crystal display or a CRT display, or a printing device such as an ink-jet printer or a laser printer. The input-output control device 23 (input-output interface) is an interface for connecting this input device 21, output device 22, or a storage device reading device such as a CD-ROM, MO, or ZIP to the CPU 11. From the standpoint of data flow, the input-output control device 23 becomes an interface between the input device 21, the output device 22, an external storage device reading device, and the main memory 25. The communication control device 24 is an interface for connecting with the network 6. Accordingly, this may be, for example, a Terminal Adapter (TA), a dial-up router, or a LAN board. In addition, this may even be data circuit-terminating equipment such as a modem, a digital service unit (DSU), a communication control unit (CCU), or a communication control processor (CCP). The main storage device 25 incorporates Read-only Memory (ROM), Random-access Memory (RAM), and a hard disk (auxiliary storage device). The hard disk functions as, for example, program memory for storing program(s) executed on the server processing and control device 11. RAM stores, for example, data used during program execution processing in the server processing and control device 11 and functions as, for example, data memory used as the working area. The IP management storage 26 stores IP management information such as an IP summary, technical items, business items, and the development schedule. Here, the IP "development schedule" may include information such as the estimated design completion date, estimated test chip completion date, and the estimated test chip evaluation completion date. It should be noted here that this IP management storage 26 may be connected to the CPU 11 via the network 6. The IP development schedule storage 27 acquires and stores information relating to the IP development schedule from the IP management information stored in the IP management storage 26. The project information storage 28 stores project data including profiles of LSIs to be developed, IPs to be used in these LSIs, and development schedule of these LSIs. Here, the LSI "development schedule" may include information such as the estimated LSI design start date, the estimated LSI sample production start date, the estimated LSI sample delivery date, and the estimated LSI mass production start date. The personal information storage 29 stores information such as the IDs and passwords of users and information providers.

The server processing and control device 11 (such as a CPU) of the server 1 encompasses an IP management unit 12, IP scheduling unit 13, project processing unit 14, matrix processing unit 15, and IP screen generating unit 16. The IP management unit 12 processes the IP management information to be input to and output from the IP management storage 26. The IP scheduling unit 13 processes the IP development schedule data to be input to and output from the IP development schedule storage 27. The project processing unit 14 processes the project data to be input to and output from the project information storage 28. The matrix processing unit 15 searches for the IP development schedule data from the IP development schedule storage 27 and the project schedule data targeted by the user from the project information storage 28, compares the relative temporal relationship of both (See FIG. 16), and performs evaluation upon the IP schedule to be used for the targeted project. The necessary processing is then carried out to generate a matrix that shows the evaluated results as the intersection of a first axis (horizontal axis), which denotes the IP name, and the other axis (vertical axis), which denotes the project data corresponding to the project. Moreover, the matrix processing control unit 15 has a function of displaying the generated matrix on, for example, the output device 22 in FIG. 2, or the user terminal 5 in FIG. 1 via the network 6. A more specific example of the matrix is shown in FIG. 20. The IP screen generating unit 16 obtains authorization related to IP design data stored in the IP management storage 26 for an IP design data provider (information provider) when a user wishes to use it.

Figure 3A:
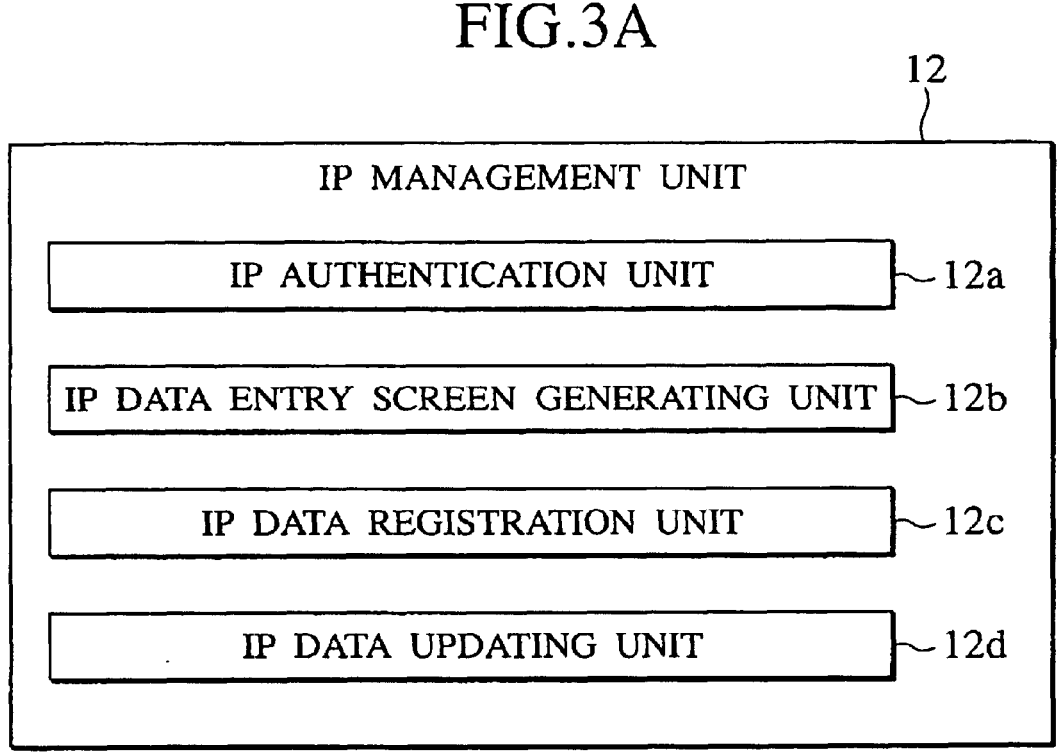
FIG. 3A is a block diagram showing the detailed configuration of an IP management unit within the LSI manufacturing support server shown in FIG. 2.
Figure 3B:
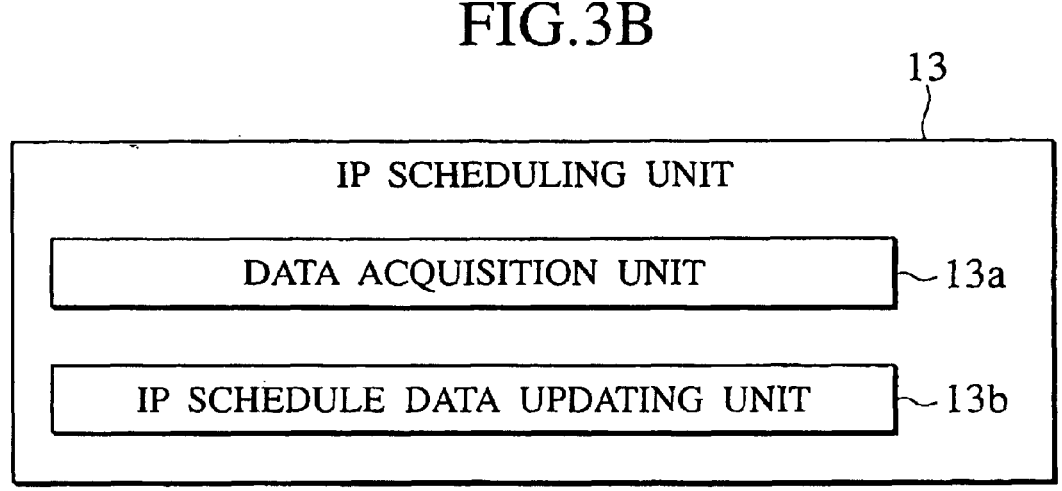
FIG. 3B is a block diagram showing the detailed configuration of an IP scheduling unit within the LSI manufacturing support server shown in FIG. 2.

As shown in FIG. 3A, the IP management unit 12 embraces an IP authentication unit 12a, an IP data entry screen generating unit 12b, an IP data registration unit (design data registration unit) 12c, and an IP data updating unit (design data updating unit) 12d. In addition, as shown in FIG. 3B, the IP scheduling unit 13 encompasses a data acquisition unit 13a and an IP schedule data updating unit (schedule data updating unit) 13b.

The IP authentication unit 12a compares an ID and password input by a person (IP developer) attempting to access the IP management storage 26 with the ID and password registered in the personal information storage 29, and performs authentication by determining if the input ID and password are valid.

The IP data entry screen generating unit 12b generates an IP data entry screen for the IP developer to input, for example, the following items into the IP management storage 26:

(1) IP summary,
(2) Technical items,
(3) IP design data,
(4) Business Issues, and
(5) IP development schedule.

Here, "IP design data" includes, for example, design data for the microscopic pattern upon the chip, circuit connection information (net list) or the source codes in behavioral description language, the operational model test vectors used in a simulation, and the detailed documents of the IP specifications and/or operating manuals, for the respective function blocks (IP) that become LSI components.

In addition, the "IP development schedule" includes the following information:

(a) Estimated IP design completion date;
(b) Estimated IP test chip production completion date; and
(c) Estimated IP test chip evaluation completion date.

The IP data registration unit 12c registers IP management information including, for example, the following items that are input through the IP data entry screen by the IP developer, into the IP management storage 26:

(1) IP summary,
(2) Technical items,
(3) Business items,
(4) IP development schedule, and
(5) IP design data.

The IP data updating unit 12d updates the registered IP management information when new IP management information is input relative to the IP management information that is registered in the IP management storage 26.

The data acquisition unit 13a acquires IP development schedule data from the IP management information into the IP development schedule storage 27. This IP development schedule data includes the IP development schedule and its bibliographic materials relating to the IP development schedule. In addition, the IP management information is input to the IP management storage.

The IP schedule data updating unit (schedule data updating unit) 13b updates the IP development schedule data stored in the IP development schedule storage 27.

(IP Management Information)

Figure 4:
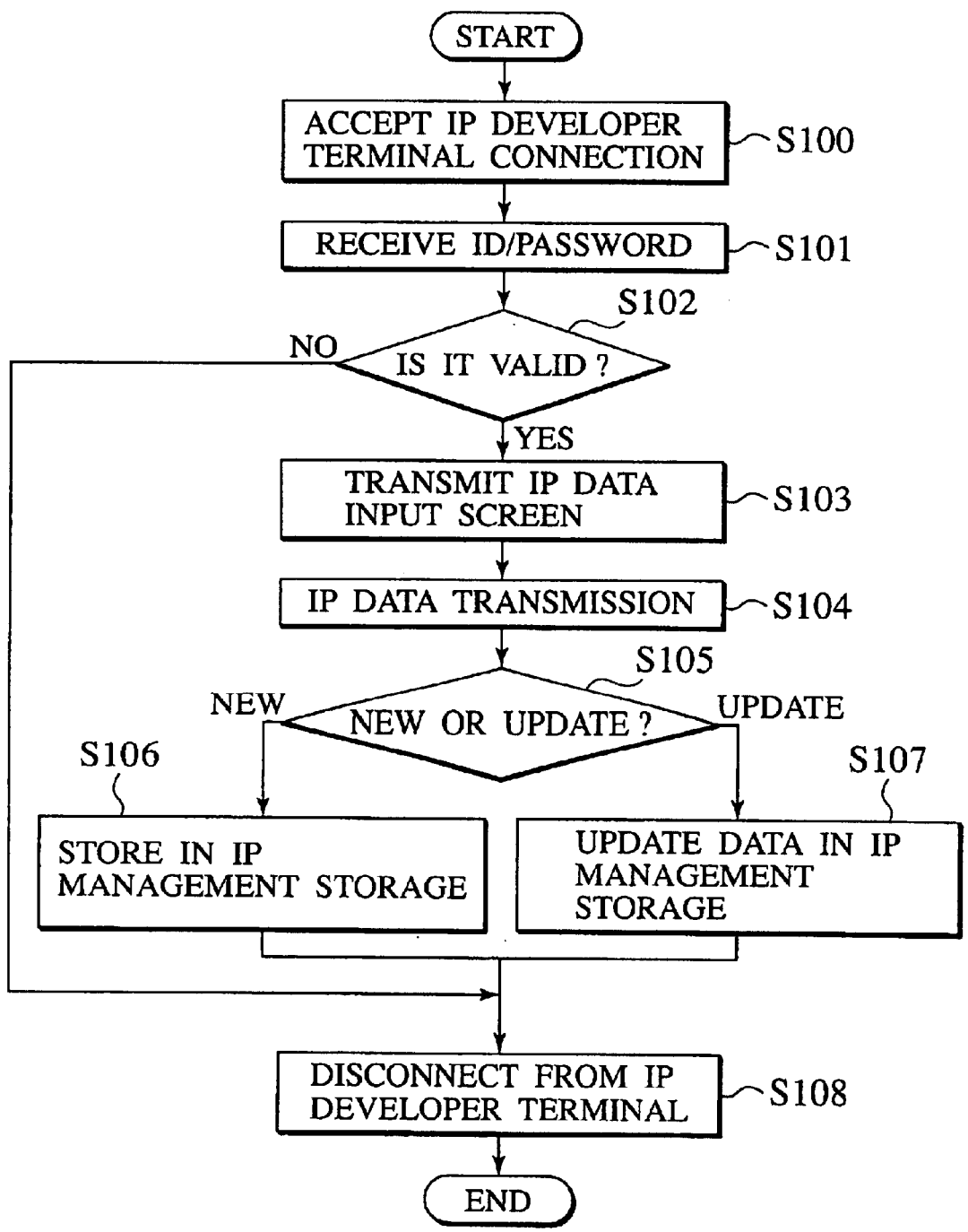
FIG. 4 is a flowchart showing the processing sequence of an LSI. manufacturing support server in the case where IP management information is registered according to the first embodiment of the present invention.

FIG. 4 is a flowchart for the server 1 on the occasion where an IP developer registers IP management information into the IP management storage 26.

(a) First, in step S100, the server 1 accepts connection from the IP developer terminal 3.

(b) Next, in step S101, the server 1 receives information such as an ID and password transmitted from the IP developer terminal 3. Moreover, in step S102, the server 1 performs a check to determine whether the received data is valid. At this point, the validity check is performed using the IP authentication unit 12a of FIG. 2, and is carried out by comparing the ID and password registered into the personal information storage 29 with the ID and password that were transmitted. In the case where the received data is not valid, in step S108, the server 1 may either disconnect the IP developer terminal 3 or again prompt the IP developer terminal 3 for input of ID, password, and/or similar information. In the case where the received data is valid, in step S103, the server 1 transmits an IP data entry screen to the IP developer terminal 3. Here, the IP data entry screen transmitted to the IP developer terminal 3 is generated using the IP data entry screen generating unit 12b of FIG. 3A.

(c) Thereafter, the server 1, in step S104, receives IP management information from the IP developer terminal 3, which is an input to the IP data entry screen transmitted in step S103. In step S105, the server 1 determines whether the received data is new data or data to be updated. In the case where it is new data, the process proceeds to step S106. In the case where it is data to be updated, the process proceeds to step S107.

(d) If it is determined in step S105 that it is new IP data, then in step S106, the server 1 stores the received IP management information in the IP management storage 26 using the IP data registration unit 12c of FIG. 3A.

If it is determined in step S105 that it is IP data to be updated, then in step S107, the server 1 updates using the IP data updating unit 12d of FIG. 3A the information already input to the IP management storage 26 with the updating information that is input this time.

(e) Finally, in step S108, the server 1 disconnects the IP developer terminal 3.

The server 1 performs update of the registered data through periodic acquire processing of IP development schedule data from the IP management storage 26 into the IP development schedule storage 27. This data acquisition is implemented using the data acquisition unit 13a of FIG. 3B. The IP development schedule data acquired here denotes data showing the temporal position related to an IP development schedule such as that shown in FIG. 5 and the bibliographic data including the IP name necessary to designate this data, from the IP management information stored in the IP management storage 26. Namely, IP development schedule data containing the items such as those shown in FIG. 5 are acquired to the IP development schedule storage 27 from the IP management storage 26. In the cases where new information is, for example, added to the IP management storage 26 in step S107, the server 1, using the TP schedule data updating unit 13b, acquires the new data from the IP management storage 26 to the IP development schedule storage 27.

Figure 6:
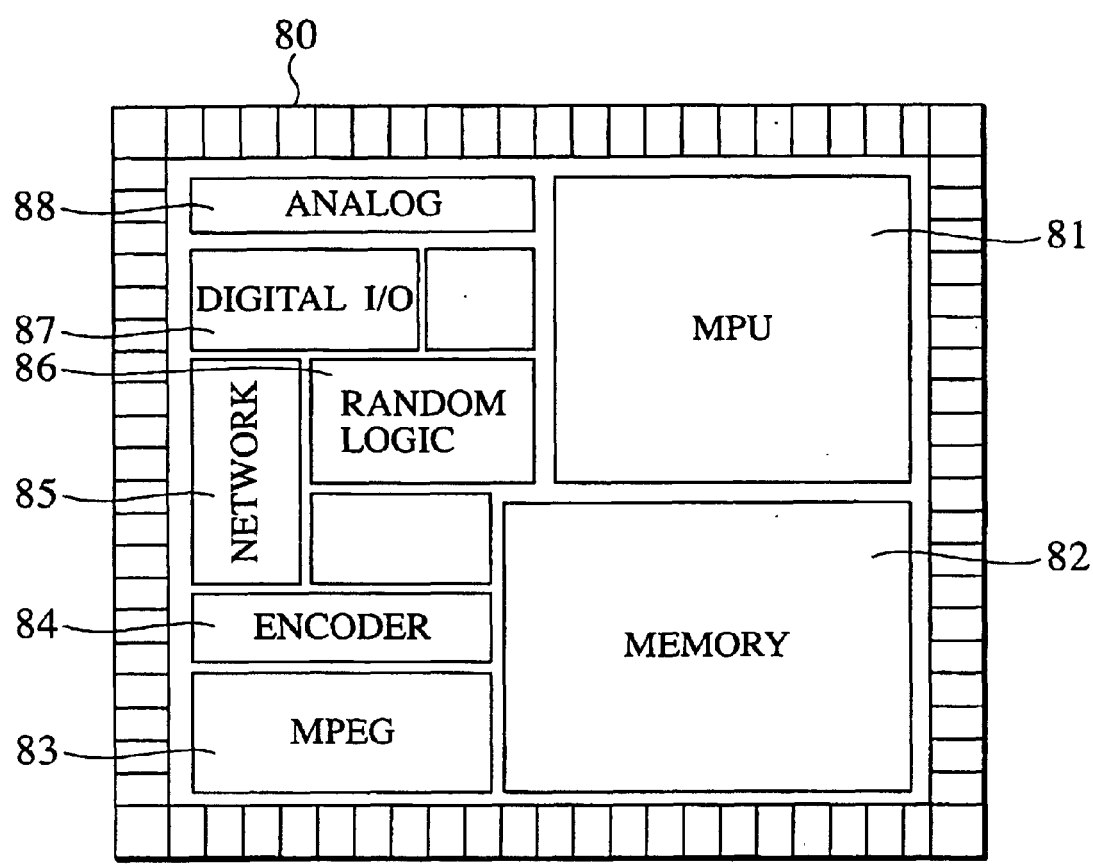
FIG. 6 is a diagram showing an example of LSI where each of the function blocks reusable as design property is integrated.

As shown in FIG. 5, the IP development schedule data includes an ID, IP name, technology, release name, detailed information, and schedule information. An "ID" is an identification number having a one-to-one correlation with an IP name. An "IP name" is the name of each IP, for example, MPU 81, memory 82, MPEG 83, encoder 84, network 85, digital I/O 87, or analog 88 shown in FIG. 6. "Technology" denotes the design rule or the generation of LSI, and is classification information for use as one of the key words for limiting a search during retrieval. A "release name" denotes another name for the IP name. If the IP name is thought of as the generic name, then the release name is the name of the derivative product. Accordingly, there are cases where the release name is the same as the IP name, as well as cases where they differ. "Detailed information" denotes a short description or comment regarding each IP. The "schedule" shown in FIG. 5 denotes the IP development schedule. With this IP development schedule, there are dates for the initially estimated completion date ("original"), the previously estimated completion date ("previous"), and the currently estimated completion date ("current"), for each of the respective items of date IP design will end ("IP design completion date"), date trial (sample) production of the IP test chip (TEG chip) will finish ("test chip completion date"), and date measurement and evaluation of the IP test chip will finish ("evaluation completion date"). It should be noted here that within parentheses for each of the items, such as "design completion date", "test chip completion date", and "evaluation completion date" is date information set with the respective dates. For example, in the case where the design end date is set to be 02 Feb. 2002, in the "original" column, in the order of (DDMMYR), "020202" is written, then in the same column, the date the design end date was decided upon (13 Jun. 2000) is written in the order of (DDMMYR) as "130600" and stored in the IP development schedule storage 27. Then, for each of the items marked "design end date", "test chip completion date", and "evaluation completion date", in the "comment" column, for example, the reason why the schedule was not met (the delay reason) is written. For example, the information regarding the record 32a in FIG. 5 has an ID of "00010", IP name of "IP1", technology name of "TC260", and release name of "ip1a".

Moreover, if the hyperlink 33 labeled "Download in CSV Format" is selected, then the user may download the viewed IP list screen 100 in Comma-Separated Value format (CSV format). Here, "CSV format" refers to a format for converting data created in spreadsheet software or database software, which is a simple text file that uses commas to separate between cells or fields (items) and separates between records with linefeed code. CSV format is widely used throughout the world.

Figure 7:
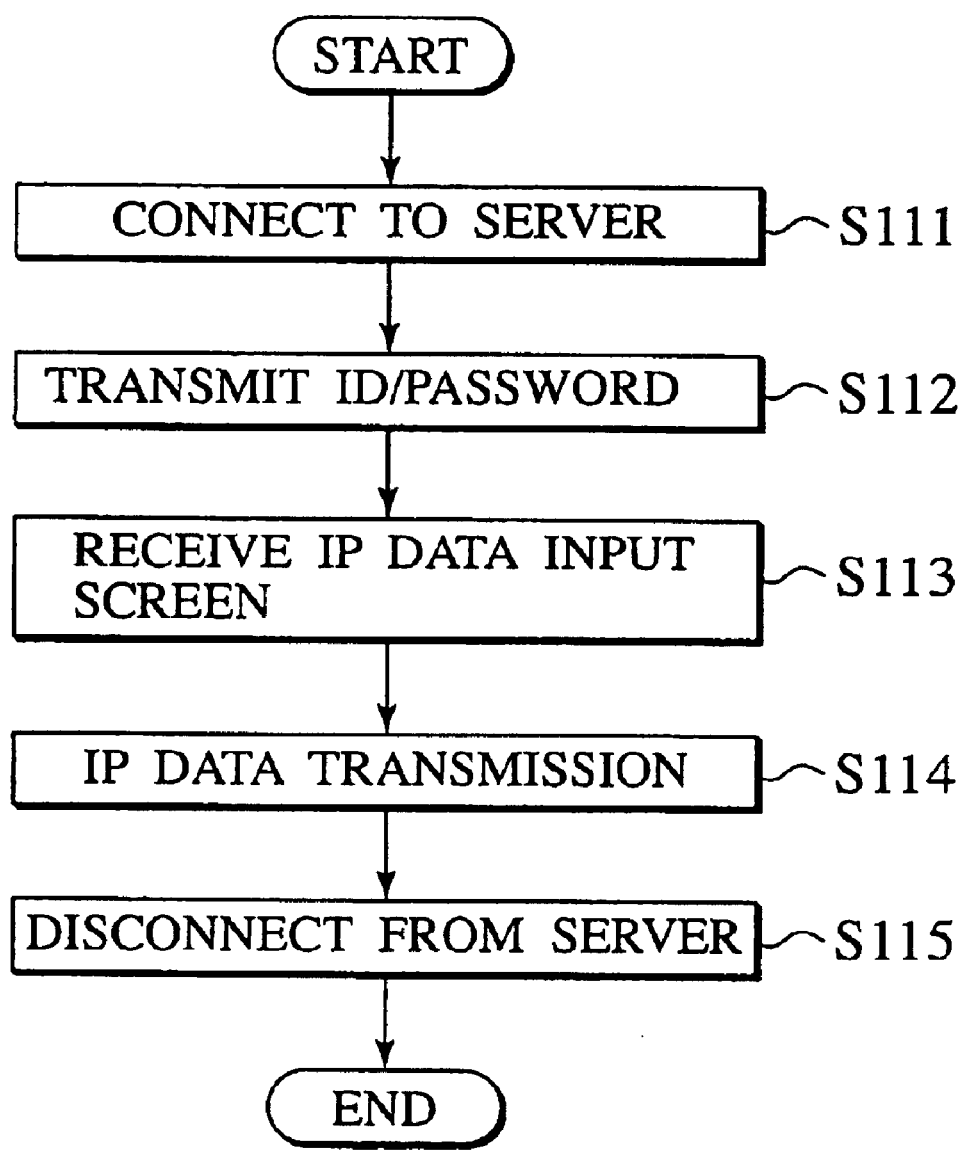
FIG. 7 is a flowchart showing the processing sequence of an IP developer terminal corresponding to FIG. 5 in the case where IP management information is registered according to the first embodiment of the present invention.

FIG. 7 is a flowchart for the IP developer terminal 3 corresponding to FIG. 4 on the occasion where an IP developer registers IP management information into the IP management storage 26.

(a) First, corresponding to step S100 in FIG. 4, in step S111, the IP developer terminal 3 connects to the server 1.

(b) Next, corresponding to step S101 in FIG. 4, in step S112, the IP developer inputs information such as an ID and password into the IP developer terminal 3, and the IP developer terminal 3 transmits the ID/password information to the server 1.

(c) Then, corresponding to step S103 in FIG. 4, in step S113, the IP developer terminal 3 receives the IP data entry screen transmitted from the server 1.

(d) Next, corresponding to step S104 in FIG. 4, in step S114, the IP developer inputs IP management information into the IP data entry screen through the IP developer terminal 3, and the IP developer terminal 3 transmits it to the server 1.

(e) Finally, corresponding to step S108 in FIG. 4, in step S115, the IP developer terminal 3 disconnects the server 1.

(Project Schedule)

Figure 8:
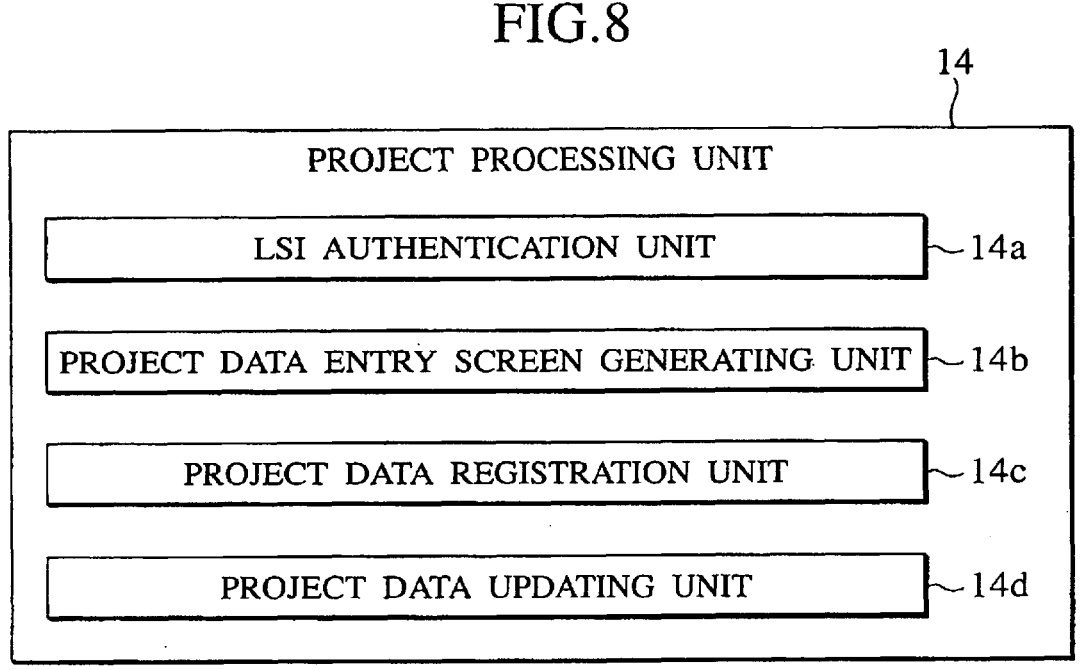
FIG. 8 is a block diagram showing the detailed configuration of a project processing unit within the LSI manufacturing support server shown in FIG. 3.

The project processing unit 14 incorporated in the server processing and control device (CPU) of the server 1, as shown in FIG. 8, encompasses an LSI authentication unit 14a, project data entry screen generating unit 14b, project data determination unit 14c, project data registration unit 14d, and project data updating unit 14e.

The LSI authentication unit 14a compares an ID and password input by a person (LSI developer) attempting to access the project information storage 28 with the ID and password registered in the personal information storage 29, and performs authentication by determining if the input ID and password are valid. The project data entry screen generating unit 14b generates a project data entry screen for the LSI developer to input to the project information storage 28 for LSI development project data, such as a summary of the LSI development schedule, the IP to be used for this LSI to be developed, and the development schedule. Here, the LSI development schedule may include, for example, the estimated LSI design start date, the estimated LSI sample production start date, the estimated LSI sample delivery and evaluation start date, and the estimated LSI mass production start date. With the project data registration unit 14c, the LSI developer registers into the project information storage 28, project data such as the LSI summary input through the new project data entry screen shown in FIG. 11, the IP to be used, and the project schedule data. The project data updating unit 14d updates the project data registered in the project information storage 28 with the new data.

In FIG. 9 there is shown a project list screen 110, which shows project data at a glance. Here, this "project data", as shown in FIG. 9, includes items such as identification number ("ID") given corresponding to each project, customer name, project name, technology name, design center name, project manager name, level of importance, project schedule data, business matters, chip unit price, expected sales quantity, price (unit×quantity), status, certainty of order, and date of last update. In addition, the "product schedule data" denotes data regarding the time schedule of the LSI development project, and as shown in FIG. 9, includes the following items (fields): design start date, trial production start date, sample shipping date, and mass production start date. "Status" represents the status of each project in terms of "FUTURE", "RFI", "RFQ", "WON", and "LOST". "FUTURE" means "this kind of LSI should be planned in the future". "RFI" is an acronym for Request for Information, means that there was contact from the customer. "RFQ" is an acronym for Request for Quotation, "WON" means that an order has been received, and "LOST" means that an order was lost (no order was made). Clicking on "Edit" 35a in FIG. 9 allows the contents of that project (Project 1) to be edited. Clicking on "Delete" 35*b* allows that project (Project 1) to be deleted.

Figure 10:
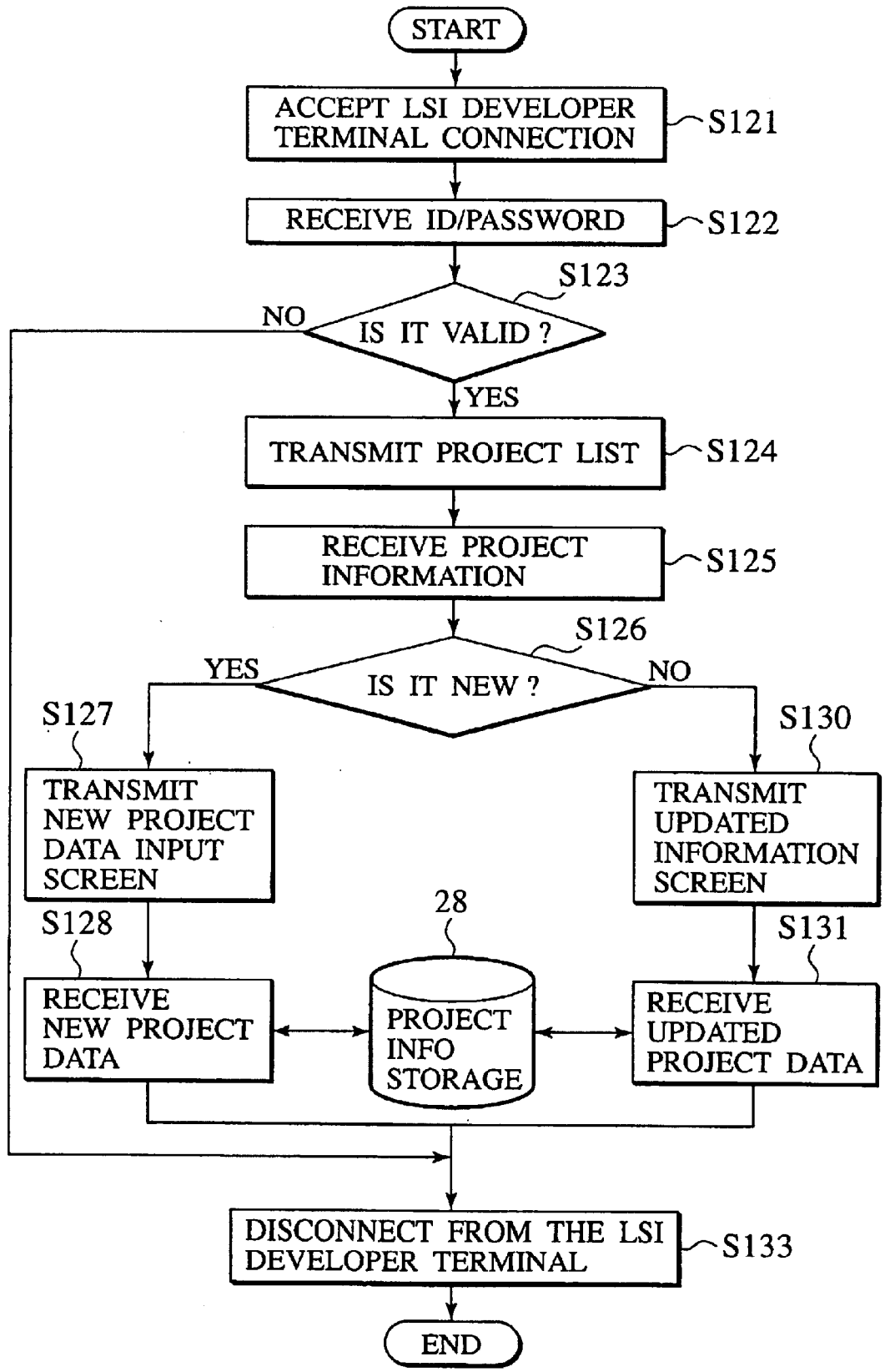
FIG. 10 is a flowchart showing the processing sequence of an LSI manufacturing support server in the case where project schedule data relating to LSI development is registered according to the first embodiment of the present invention.

FIG. 10 is a flowchart for the server 1 on the occasion where an LSI developer registers project data regarding LSI development into the LSI management storage 28.

(a) First, in step S121, the server 1 accepts connection from the LSI developer terminal 4.

(b) Next, in step S122, the server 1 receives information such as an ID and password transmitted from the LSI developer terminal 4. Moreover, in step S123, the server 1 performs a check to determine whether the received data is valid. The validity check performed at this point uses the LSI authentication unit 14*a* of FIG. 8, and is carried out by comparing the ID and password registered in the personal information storage 29 with the ID and password that are received. In the case where the received data is not valid, in step S133, the server 1 may either disconnect the LSI developer terminal 4 or again prompt the LSI developer terminal 4 for input of ID, password, and/or similar information. In the case where the received data is valid, in step S124, the server 1 transmits a project list screen 110 shown in FIG. 9 to the LSI developer terminal 4.

(c) Next, the LSI developer views the project list screen 110 and determines whether the project information about to be input is a "new registration" or an "update". In the case of a "new registration", clicks the "Add New Project" button 34 of FIG. 9, and in the case of an "update", clicks the "EDIT" button 35*a*. In step S125, the server 1 receives the project information of the "new registration" or "update" input to the project list screen 110 from the LSI developer terminal 4. It should be noted that with the project list screen 110 shown in FIG. 9, if the LSI developer clicks the "Delete" button 35*b*, the project data stored in the project information storage 28 could be deleted. In addition, if the LSI developer selects the hyperlink 33 labeled "Download in CSV format", the project list being viewed can be downloaded in CSV format.

(d) Next, in step S126, the server 1 determines whether or not there is newly registered project data. In FIG. 9, in the case where the LSI developer clicks the "Add New Project" button 34, it is determined as project data to be newly registered, and in step S127, the server 1, as shown in FIG. 11, transmits a new project data entry screen 120 to the LSI developer terminal 4. This new project data entry screen 120 is generated with the project data entry screen generating unit 14*b* of FIG. 8. As shown in FIG. 11, in the new project data entry screen 120, a text box or drop down list is prepared for inputting the customer name, project name, technology name, design center name, project manager name, level of importance, project schedule data, business matters, chip unit price, expected sales quantity, price (unit× quantity), status, certainty of order, and date of last update. Here, "project data" may include information such as the design start date, the trial production start date, the sample shipping date, and the mass production start date. Moreover, the LSI developer may select the IP used in this project from the IP list 121 shown in FIG. 11. The IP list 121 may have items such as check item 91, IP name, technology, release name, and the schedule listed. In the schedule, the design completion date, test chip completion date, and evaluation completion date are shown, and date of update is shown in the parentheses. A check is then placed in the radio button of the check item 91 corresponding to the IP selected by the LSI developer, and once the "OK" button 36 is clicked, this new project data is transmitted from the LSI developer terminal 4 to the server 1.

(e) Next, in step S128, the server 1 receives the new project data the LSI developer terminal 4 input using the new project data entry screen shown in FIG. 11. The new project data received is stored in the project information storage 28 using the project data registration unit 14*c* of FIG. 8. In the case where the "EDIT" button 35*a* in the project list screen shown in FIG. 9 is clicked by the LSI developer, in step S126, the server 1 determines that it is not project data to be newly registered, and in step S130, the server 1 transmits the update information input screen 128 as shown in FIG. 12. This update information input screen 128 is generated with the project data entry screen generating unit 14*b* of FIG. 8. As shown in FIG. 12, in the update information input screen 128, information such as the customer name, project name, technology name, design center name, project manager name, level of importance, project schedule data (the design start date, trial production start date, sample shipping date, and mass production start date), business matters, chip unit price, expected sales quantity, price (unit×quantity), status, certainty of order, and date of last update is displayed. For example, with the example shown in FIG. 12, the customer name is "Customer 1", the project name is "Project 1", the technology name is "TC260", the design center name is "West", the project manager name is "Project manager 1", the design start date is "010700 (01 Jul. 2000)", the trial production start date is "011200 (01 Dec. 2000)", the sample shipping date is "010201 (01 Feb. 2001)", the mass production start date is "010601 (01 Jun. 2001)", and the date of last update is "170101 (17 Jan. 2001)". In addition, the IP used for the project 1 are IP4 and IP5, which have radio buttons 91*a* and 91*b* in the check item 91 checked. Then in the update information input screen 128 shown in FIG. 12, changes and additions may be performed for information that is currently input as well as information that is not currently input. Finally, after input of predetermined updated information, if the LSI developer clicks "OK" button 36, the updated project data is transmitted from the LSI developer terminal 4 to the server 1. The server 1 receives the updated project data input through the LSI developer terminal 4 with the updated information input screen 128 in step S131. In the same step, using the project data updating unit 14*d* shown in FIG. 8, the updated project data is then stored in the project information storage 28.

(f) Finally, in step S133, the server 1 disconnects the LSI developer terminal 4.

FIG. 13 is a flowchart for the LSI developer terminal 4 corresponding to FIG. 10 on the occasion where an LSI developer registers project data regarding LSI development into the project information storage 28.

(a) First, corresponding to step S121 in FIG. 10, in step S141, the LSI developer terminal 4 connects to the server 1.

(b) Next, corresponding to step S122 in FIG. 10, in step S142, the LSI developer inputs information such as an ID and password into the LSI developer terminal 4, and the LSI developer terminal 4 transmits the ID/ password information to the server 1.

(c) Then, corresponding to step S124 in FIG. 10, in step S143, the LSI developer terminal 4 receives the project list screen 110, as shown in FIG. 9, transmitted from the server 1.

(d) Next, corresponding to step S125 in FIG. 10, in step S144, the LSI developer clicks either the "Add New Project" button 34 or the "EDIT" button 35a in the project list screen 110 shown in FIG. 9, and the information of the button selected by being clicked is transmitted to the LSI manufacturing support server by the LSI developer terminal 4.

(e) Then, corresponding to step S126 in FIG. 10, whether the project data input in step S144 is new or not is determined in step S145. In the case where it is new project data, corresponding to step S127 in FIG. 10, in step S146, the LSI developer terminal 4 receives the new project data entry screen 120 shown in FIG. 11, and the LSI developer inputs the new project data. Then, corresponding to step S128 in FIG. 10, in step S147, the LSI developer terminal 4 transmits the new project data to the server 1. In the case where it is not new project data, corresponding to step S130 in FIG. 10, in step S148, the LSI developer terminal 4 receives the update information input screen 128 shown in FIG. 11 from the server 1, and the LSI developer inputs the updated project data to the update information input screen 128. Then, corresponding to step S131 in FIG. 10, in step S149, the LSI developer terminal 4 transmits the updated project data to the server 1.

(f) Finally, corresponding to step S133 in FIG. 10, in step S150, the IP developer terminal 4 disconnects the server 1.

(Matrix Display)

Figure 14:
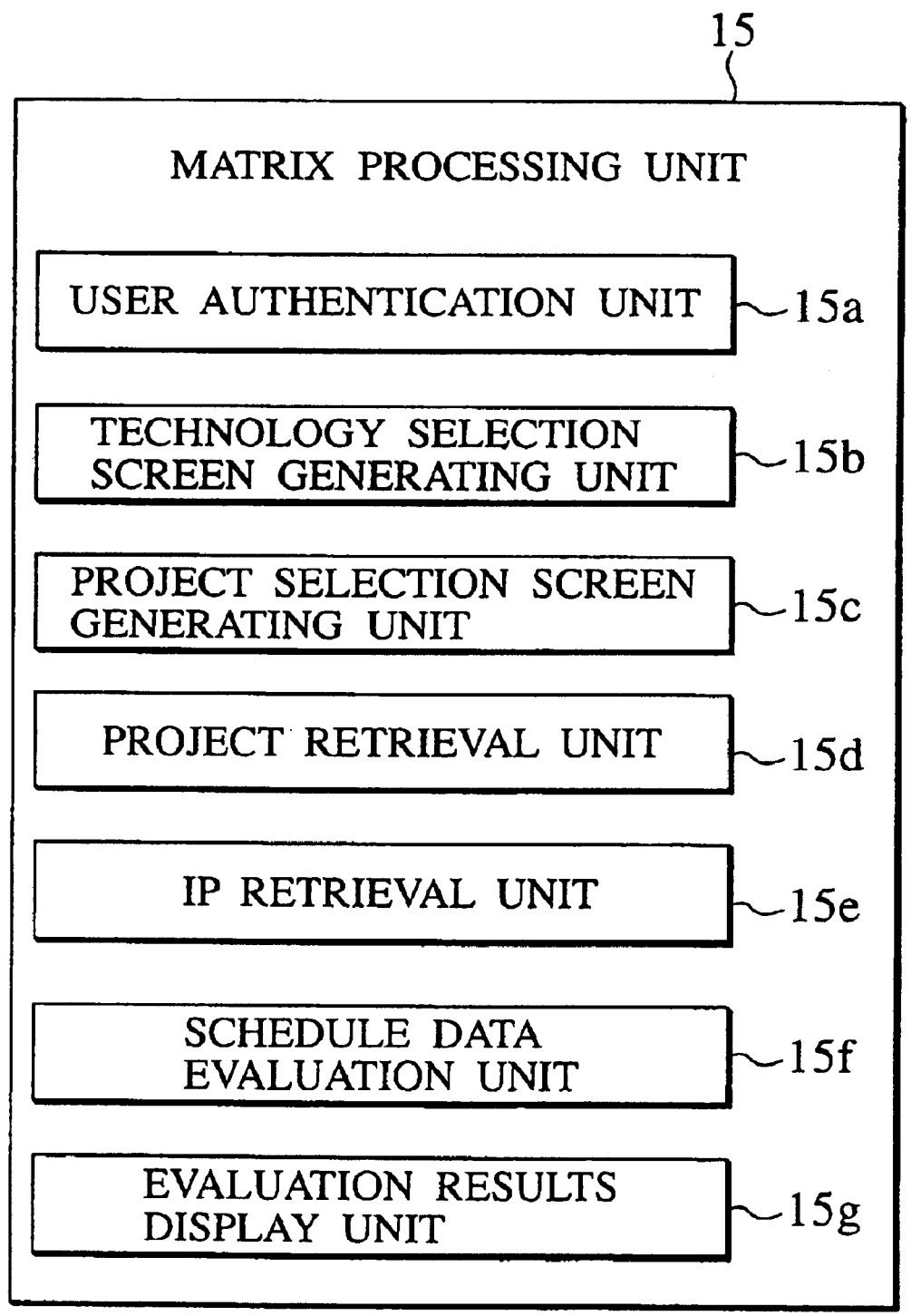
FIG. 14 is a block diagram showing the detailed configuration of a matrix processing unit within the LSI manufacturing support server shown in FIG. 3.

FIG. 14 is a block diagram showing a matrix processing unit 15 incorporated in the server processing and control device 11 used when IP development information used in an LSI development project is being viewed by a user of, for example, an LSI manufacturing support server 1, LSI manufacturing support method, and an LSI manufacturing support program, such as an IP developer and LSI developer. The matrix processing unit 15 embraces a user authentication unit 15a, technology selection screen generating unit 15b, project selection screen generating unit 15c, project retrieving unit 15d, IP retrieving unit 15e, schedule data evaluation unit 15f, and evaluation result display unit 15g.

The user authentication unit 15a compares an ID and password input by a user attempting to perform matrix display of an IP development schedule and a project schedule for LSI development with the ID and password registered into the personal information storage 29, and performs authentication by determining if the input ID and password are valid. The technology selection screen generating unit 15b generates a technology selection screen used for selecting technology the user has classified by design rule. The project selection screen generating unit 15c searches the project information storage 28 using as a keyword technology (design rule) the user selected, and retrieves a list of projects pertinent to that technology (hereafter referred to as a "project list"). The project retrieving unit 15d retrieves project data the user has selected from the project list from the project information storage 28 The IP retrieving unit 15e retrieves IP development schedule data of IP corresponding to the project data retrieved by the project retrieving unit 15d. The schedule data evaluation unit 15f performs evaluation of the relative temporal relationship of the IP development schedule and the LSI development schedule by determining which stage 1P test chip evaluation date is at in the development schedule of the LSI indicated by the project schedule data configuring the respective project data, based on the evaluation standard 90 as shown in FIG. 16.

The evaluation results display unit 15g displays the results of evaluating the status of progression in the project schedule data relating to LSI development and the IP development schedule, which is scheduled to be used in that LSI in a matrix such as that in FIG. 20. The vertical axis of the matrix in FIG. 20 shows the project data corresponding to the LSI development project, and the horizontal shows the type of IP.

Figure 15:
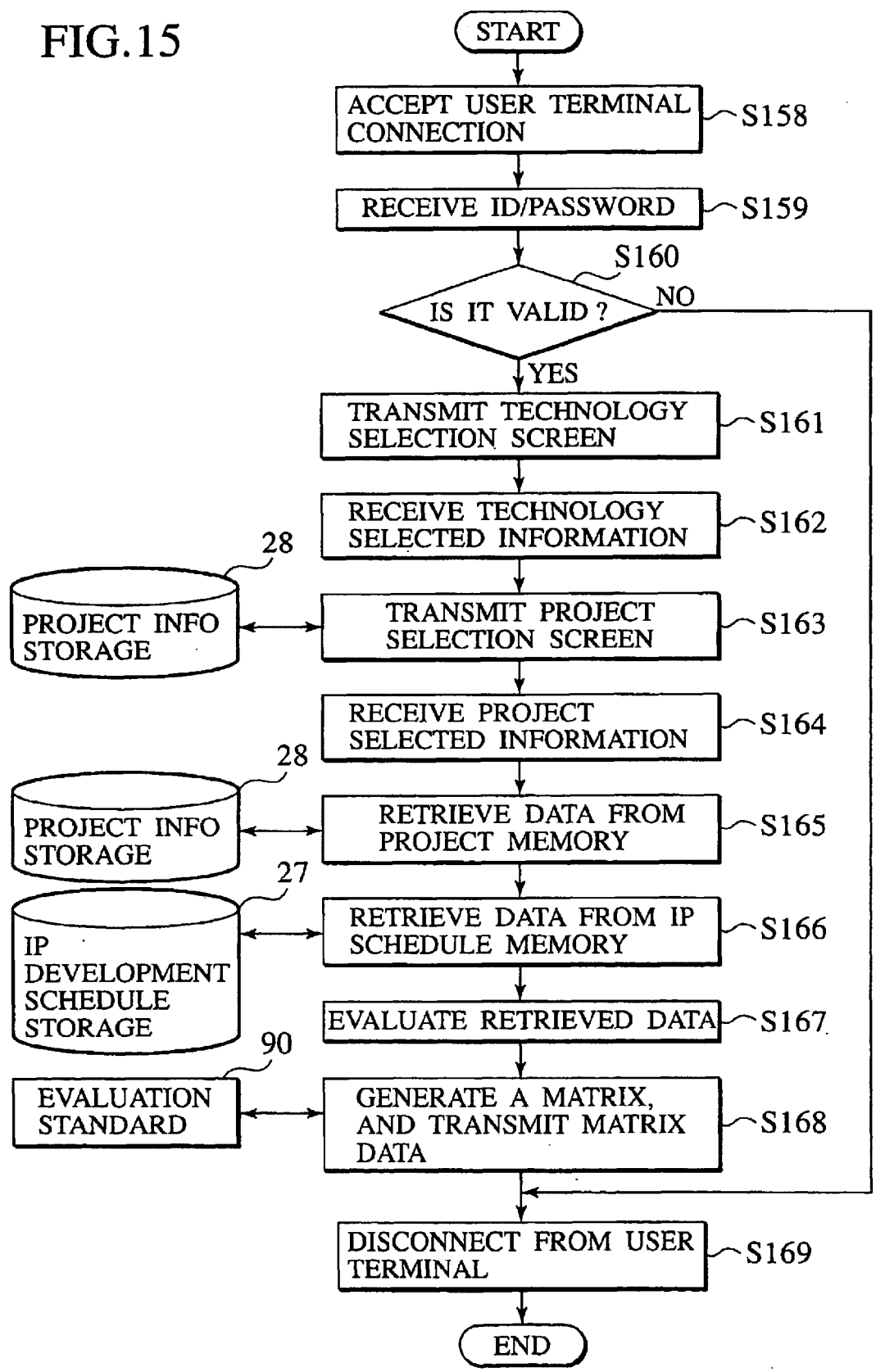
FIG. 15 is a flowchart showing the processing sequence of an LSI manufacturing support server in the case of matrix display according to the first embodiment of the present invention.

FIG. 15 is a flowchart of the server 1 when a user views IP development information in the case where an attempt is made to use IP in an LSI development project.

(a) First, in step S158, the server 1 accepts connection from the user terminal 5. At this point the user terminal 5 may be the LSI developer terminal 4 or the IP developer terminal 3.

(b) Next, in step S159, the server 1 receives information such as an ID and password transmitted from the user terminal 5. Moreover, in step S160, the server 1 performs a check to determine whether the received data is valid. At this point, a validity check is performed using the user authentication unit 15a of FIG. 14, and is carried out by comparing the ID and password registered in the personal information storage 29 with the ID and password that were entered. In the case where the received data is not valid, in step S169, the server 1 may either disconnect the user terminal 5 or again prompt the user terminal 5 for input of ID, password, and/or similar information. In the case where the received data is valid, in step S161, the server 1 transmits a technology selection screen 130 for selecting technology shown in FIG. 17A to the user terminal 5. This technology selection screen 130 is generated using the technology selection screen generating unit 15b of FIG. 14.

Figure 17A:
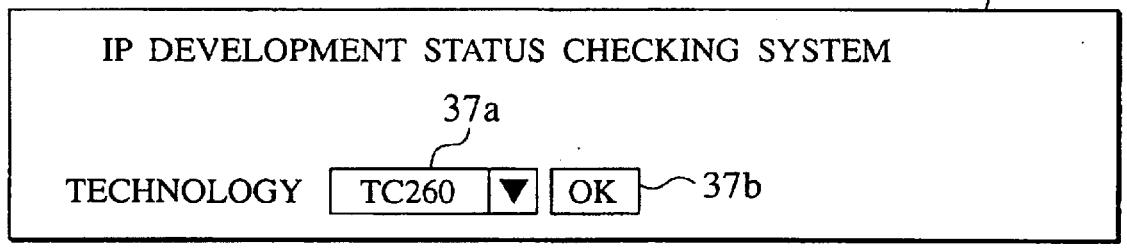
FIG. 17A is a display screen example for displaying on a user terminal a technology selection screen according to the first embodiment of the present invention.
Figure 17B:
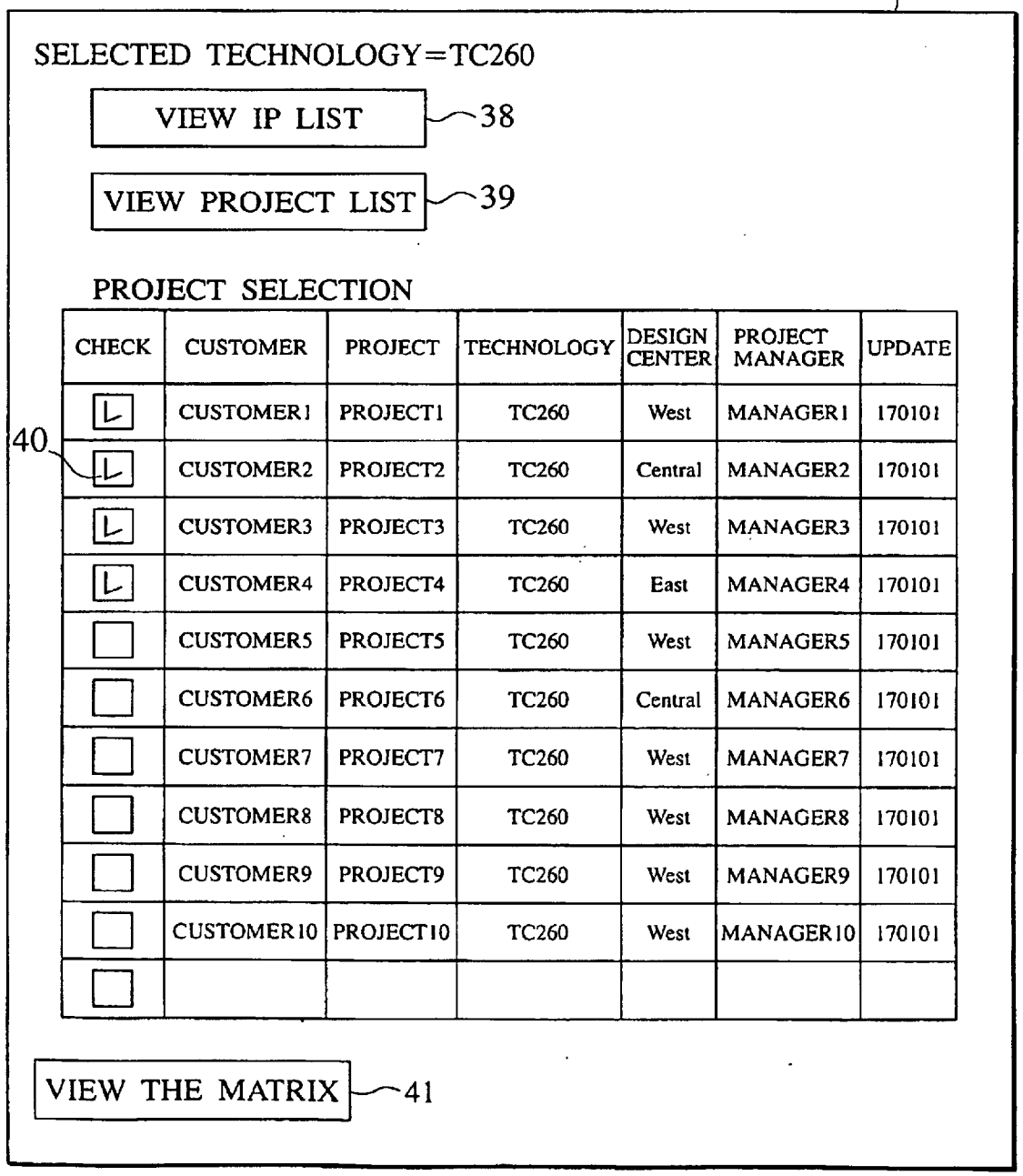
FIG. 17B is a display screen example for displaying on a user terminal a project selection screen according to the first embodiment of the present invention.

(c) On the technology selection screen 130 shown in FIG. 17A, the user selects, for example, technology "TC260" in a technology selection box 37a having a drop-down list format, and clicks the "OK" button 37b. The information of the selected technology is transmitted to the server 1 from the user terminal 5. In step S162, the server 1 receives the technology (design rule) selected by the user as "technology selection information". The server 1 then retrieves the project list in the project information storage 28 corresponding to the received technology selection information using the project selection screen generating unit 15c shown in FIG. 14, and generates a project selection screen 131 as shown in FIG. 17B. For instance, the project selection screen generating unit 15c retrieves that which is the technology of TC260 from the projects stored in the project information storage 28, and displays the project list on the project selection screen 131 as shown in FIG. 17B. Then, in step S163, the server 1 transmits the project selection screen 131 to the user terminal 5.

(d) The user selects the desired project to be evaluated with the matrix by adding a check to the check box 40 in the project selection screen 131 shown in FIG. 17B. Here, if the user (the IP developer or LSI developer) clicks the "View IP List" button 38 shown in FIG. 17B, the details of each IP may be viewed in an IP list like that shown in FIG. 5. In addition, if the user clicks the "View Project List" button 39, details of each set of project data may be viewed in a project list such as that shown in FIG. 9. Moreover, if the user clicks the "View the Matrix" button 41, the selected project selection information may be transmitted to the server 1. There, in step S164, the server 1 receives "project selection information" showing which set of project data the user selected.

(e) Next, in step S165, the server 1 references the project information storage 28, and retrieves the project schedule data that is included in the project data corresponding to the project selection information. This retrieving process is carried out using the project retrieving unit 15d shown in FIG. 14.

(f) In step S166, the server 1 then references the IP development schedule storage 27 based on the retrieved project schedule data, retrieves the IP development schedule data related to the IP the selected project data uses. This retrieving process is carried out using the IP retrieving unit 15e shown in FIG. 14.

(g) Next, in step S167, the server 1 compares the relative temporal relationship of the project schedule data relating to the retrieved LSI development and the IP development schedule data, based on the evaluation standard 90. An example of the evaluation standard 90 used here is shown in FIG. 16. Typically, the IP development schedule encompasses an IP design stage for designing new IP (steps S21a, S21b, S21c), an IP test chip trial production stage based on this IP design (steps S22a, S22b, S22c), and an IP test chip evaluation stage for evaluating IP test chips produced through the trial production (steps S23a, S23b, S23c). On the other hand, the LSI development schedule generally consists of an LSI design stage for designing desired LSI (step S11), an LSI trial production stage for making a trial production run of the designed LSI (step S12), and sample shipping stage, where LSI produced through the trial production are shipped to the customer (step S13). The next stage is the LSI mass production stage, where the LSIs are commercially produced (step S14). In order to bring the IP development schedule and the LSI development schedule into alignment, evaluation of the relative relationship of both are evaluated with standards such as the following:

(i) When the evaluation completion date (evaluation end date) for the IP test chip in step S23a is earlier than the estimated LSI design start date in step S11, an evaluation of "GOOD" is given since the IP design is ready and can be used immediately for the corresponding LSI design.

(ii) In the case where the evaluation completion date (evaluation end date) of the IP test chip in step S23b is between the LSI design start date in step S11 and the LSI sample production start date in step S12, an evaluation of "RISK" is given because it is a situation having a degree of risk since the IP test chip evaluation is not finished by the LSI sample production start date. This case allows the possibility of halting the start of LSI trial production, which incurs high costs, in step S12 if it has commenced in the event malfunctions are found at the stage where the IP test chip evaluation completes in step S23b.

(iii) In the case where the IP test chip evaluation end date in step S23c is later than the LSI sample production start date in step S12, an evaluation of "NO GOOD" is given since there is a possibility of defects in the LSI sample production if the go ahead to proceed is given without having finished IP test chip evaluation at the time when the LSI sample production begins in step S12. This is because, if a malfunction is found at the stage where IP test chip evaluation ends in step S23c, this case may result in the sample production being a waste since the LSI sample production in step S12 is already under way.

As described in step S167 shown in FIG. 15, the server 1 compares relatively the project schedule data related to LSI development retrieved from the project information storage 28 with the IP development schedule data retrieved from the IP development schedule storage 27, and evaluates the risk in starting sample production of LSI using the evaluation standard 90 mentioned earlier. Evaluation processing carried out in this manner, is implemented using the schedule data evaluation unit 15f of FIG. 14.

(h) In step S168, the server 1 represents the evaluation results in a matrix such as that shown in FIG. 20 and transmits the matrix screen to the user terminal 5. The matrix generated for transmission to the user terminal 5 is generated using the evaluation results display unit 15g of FIG. 14.

(i) Finally, in step S169, the server 1 disconnects the user terminal 5.

Figure 19A:
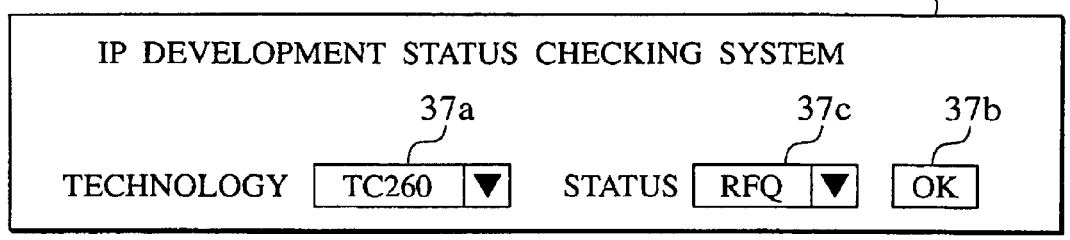
FIG. 19A is a display screen example for displaying on a user terminal a technology selection screen according to the first embodiment of the present invention.

It should be noted that the technology selection screen 130 shown in FIG. 17A may be the technology selection screen 132 shown in FIG. 19A. In the technology selection screen 132 of FIG. 19A, besides the technology selection box 37a, there is also a status selection box 37c allowing status ("FUTURE", "RFI", "RFQ", "WON", and "LOST") to be selected. For instance, in the case where "RFQ (request for quotation)" is selected in status selection box 37c, those projects displayed in the project selection screen 131 shown in FIG. 17B having the status of "RFQ" will be listed.

Figure 18:
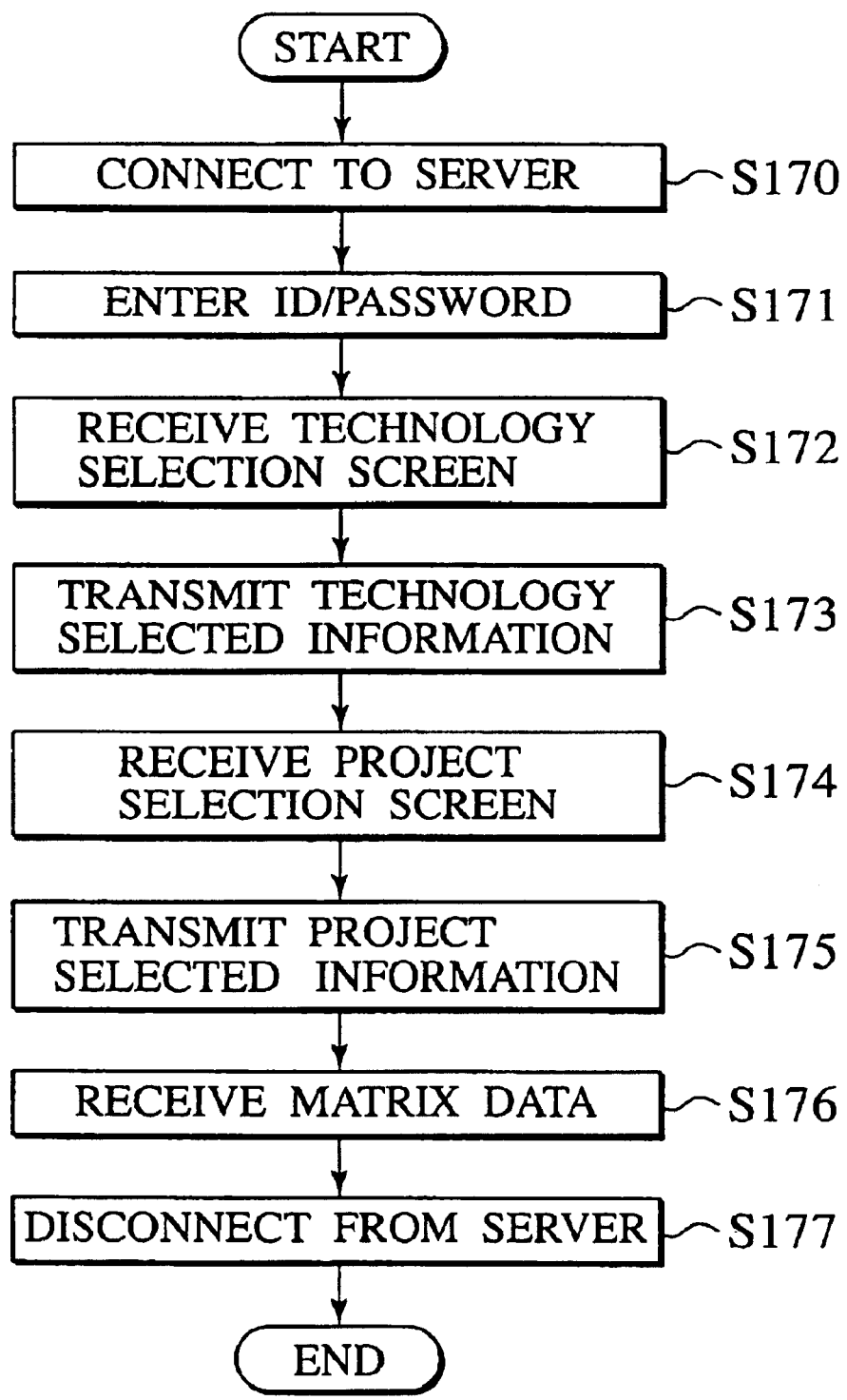
FIG. 18 is a flowchart showing the processing sequence of user terminal in the case of matrix display screen according to the first embodiment of the present invention.

FIG. 18 is a flowchart of the user terminal 5 corresponding to FIG. 15 in the case where a user views the IP development schedule information to be used in the LSI development project.

(a) First, corresponding to step S158 in FIG. 15, in step S170, the user terminal 5 connects to the server 1.

(b) Next, corresponding to step S159 in FIG. 15, in step S171, the user (IP developer or LSI developer) inputs information such as an ID and password into the user terminal 5, and transmits the ID/password information to the server 1.

(c) Then, corresponding to step S161 in FIG. 15, in step S172, the user terminal 5 receives the technology selection screen 130 such as that shown in FIG. 17A.

(d) Next, corresponding to step S162 in FIG. 15, in step S173, the user selects a technology from the technology selection box 37a, and transmits technology selection information from the user terminal 5 to the server 1.

(e) Next, corresponding to step S163 in FIG. 15, in step S174, the user terminal 5 receives from the server 1 a project selection screen 131 such as that shown in FIG. 17B that is retrieved based on the technology selection information.

(f) Next, corresponding to step S164 in FIG. 15, in step S175, the user selects a project in the project selection screen 131, and transmits project selection information from the user terminal 5 to the server 1.

(g) Next, corresponding to step S168 in FIG. 15, in step S176, the user terminal 5 receives matrix information such as that shown in FIG. 20 from the server 1.

(h) Finally, corresponding to step S169 in FIG. 15, in step S177, the user terminal 5 disconnects the server 1.

Figure 19B:
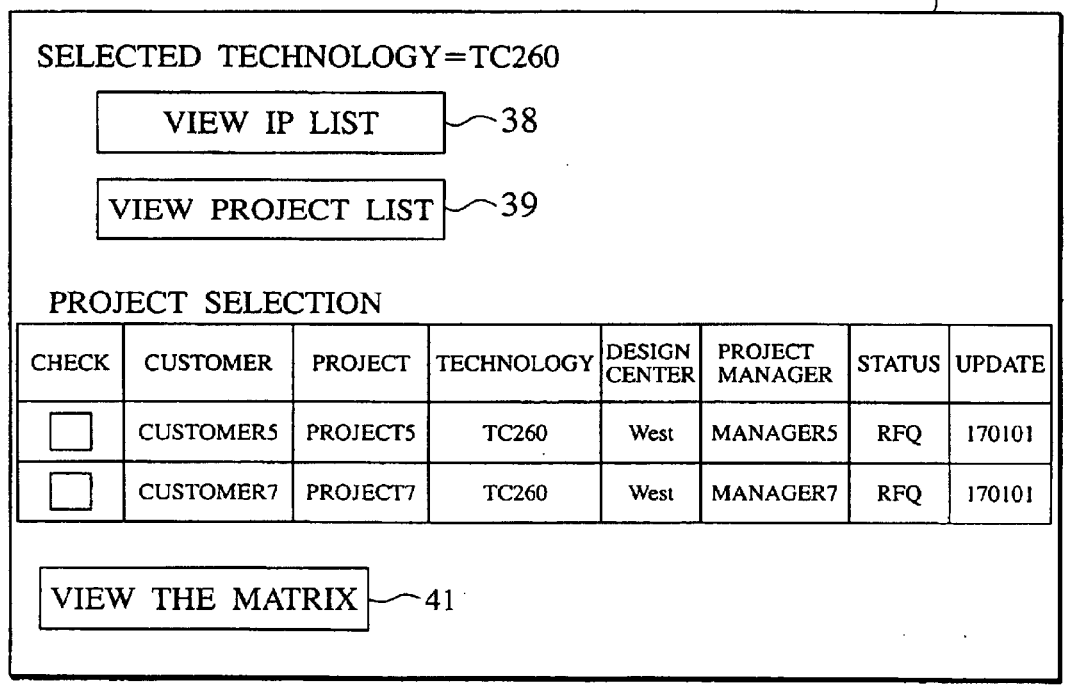
FIG. 19B is a display screen example for displaying on a user terminal a project selection screen according to the first embodiment of the present invention.

It should be noted that, as shown in FIG. 19A, the technology selection screen 130 shown in FIG. 17A may use status selection boxes 37c in addition to the technology selection box 37a. In the case where, as shown in FIG. 19A, the status is also chosen from the status selection box 37c, projects that have the selected technology and additionally have the selected status, as shown in FIG. 19B, are listed. It should be noted that besides the status selection box 37c, selection boxes for allowing selection of, for example, the design center may also be added.

FIG. 20 shows an example of a matrix screen. With this matrix screen (matrix list 134), the vertical axis is given as the project data corresponding to the project schedule data, and the horizontal axis is given as the IP name corresponding to the IP development schedule data, wherein the results of evaluating the relative temporal relationship between the project schedule data and the IP development schedule data is illustrated at the intersection of the vertical axis and the horizontal axis based on an evaluation standard 90 such as that shown in FIG. 16. Items such as customer name, project name, design center name, project manager name, data update date, design start date, and trial production start date may be displayed as project data on the vertical axis. In addition, the IP test chip evaluation completion date is displayed in parentheses along with the IP name for the IP names along the horizontal axis.

For example, the project data 30a of FIG. 20 has a customer name of "Customer 1", project name of "Project 1", design center name of "West", project manager name of "Project manager 1", data update date of "17 Jun. 2001", design start date of "01 Jul. 2000", and trial production start date of "01 Dec. 2000". In addition, the IP names used for this project 1 are IP3 and IP4. The IP3 used in this project 1 has the IP test chip evaluated on 07 Feb. 2001. Accordingly, since the IP evaluation completion date (estimated evaluation completion date) (07 Feb. 2001) is later than the LSI design start date (01 Dec. 2000), an evaluation of "NO GOOD" is given, "NO GOOD" is displayed in the evaluation item 31a, and a viewer may visually understand the effects due to the disagreement of the schedules. It should be noted that the numbers in parentheses in evaluation item 31a is the IP evaluation completion date, and is the same as displayed in the stage above. Similarly, the test chip evaluation completion date for the IP4 used in the project 1 is 01 Jan. 2001, and the LSI design start date is 01 Jul. 2000, which means that the IP test chip evaluation completion date for the IP4 is later than the LSI design start date. Accordingly, an evaluation of "NO GOOD" is given, and "NO GOOD" is displayed in evaluation item 31b as well.

As with the project 1, when comparing the project 2 listed in the project data field 30b and the IP4 to be used in the project 2, the LSI design start date for project 2 is 01 Sep. 2000, the LSI trial production date is 01 Feb. 2001, and the IP test chip evaluation completion date is 07 Feb. 2001 for the IP3. Accordingly, since the IP test chip evaluation completion date for the IP3 is later than the design date, the evaluation given in the item 31c is "NO GOOD". In the same manner, since the IP test chip evaluation completion date is 01 Jan. 2001, the LSI design start date for project 2 is 01 Sep. 2000, and the trial production date is 01 Feb. 2001, the IP test chip evaluation completion date is earlier than the LSI trial production date, and the evaluation given in the item 31d becomes "RISK".

As described, by comparing the LSI design start date or the trial production start date with the IP test chip evaluation completion date, matrix display of the LSI development schedule and the IP development schedule may be automated based on the evaluation standard shown in FIG. 16, and can implement effective and timely display of complex, dynamic data in real time.

Moreover, if the hyperlink 33 labeled "Download in CSV format" is selected, the list being viewed may be downloaded in CSV format.

Second Embodiment

The second embodiment of the present invention is described through the description of data flow in the case where a user accesses the IP management storage 26 and downloads IP design data while referencing FIG. 21 through FIG. 38.

As shown in FIG. 21, an LSI manufacturing support system according to the second embodiment of the present invention embraces an LSI manufacturing support server 1, a user terminal 5, an information provider terminal 7, and a network 6 interconnecting each of these. According to the embodiments of the present invention, a LAN is given as the network, however other networks such as the Internet or a dial up network are also allowable. The information provider terminal 7 and the user terminal 5 may be plural.

The server 1 is a server for collectively managing and providing IP catalog information and design data used as components during LSI design. "Catalog information" includes names, features, main characteristic values and other information found in catalogs. "Design data" refers to, for example, RTL, test vectors, parameters, GDS, and documents that are actually used during LSI design. The information provider terminal 7 is a terminal for an IP developer to register IP into the IP management storage 26 shown in FIG. 23, receive acknowledgement request mail from the user terminal 5 via the server 1, and perform acknowledgement authorization processing with the server 1. The user terminal 5 issues acknowledgement requests and downloads design data of accepted IP.

The server 1, information provider terminal 7, and user terminal 5 are respectively encompasses a CPU, input device, output device, temporary storage device (main storage device), etc., as described in the first embodiment. The CPU of the server 1 is provided with, for example, online control unit and database management unit, as with the first embodiment.

Figure 22:
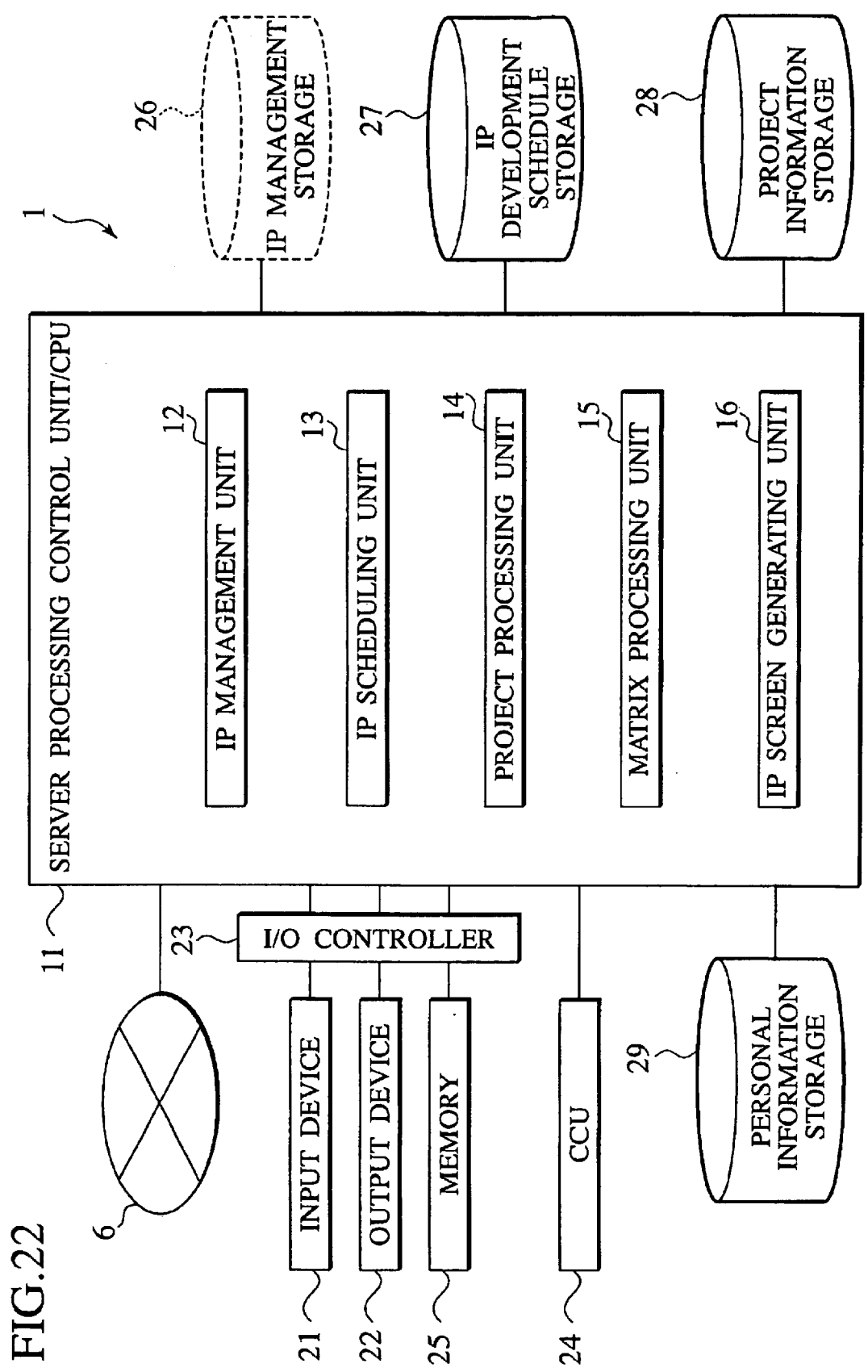
FIG. 22 is a block diagram showing the configuration of an LSI manufacturing support server in the LSI manufacturing support system shown in FIG. 21.

As shown in FIG. 22, an LSI manufacturing support server 1 according to the second embodiment of the present invention embraces at least, as described in the first embodiment of the present invention shown in FIG. 2, a server processing and control device (CPU) 11; an input device 21, output device 32, and main memory 25, which are connected to the CPU 11 via an input-output control device 23; and an IP management storage 26, IP development schedule storage 27, project information storage 28, and personal information storage 29 connected to the CPU 11. Although omitted from the drawings, database management unit are provided for the CPU 11 as with the first embodiment.

The CPU 11 encompasses an IP management unit 12, IP scheduling unit 13, project processing unit 14, and matrix processing unit 15, and differs from the first embodiment in that it is further encompasses an IP screen generating unit 16.

The IP screen generating unit 16 controls processing for obtaining authorization related to IP design data stored in the IP management storage 26 for an IP design data provider terminal (information provider terminal) when a user wishes to use it.

Figure 23:
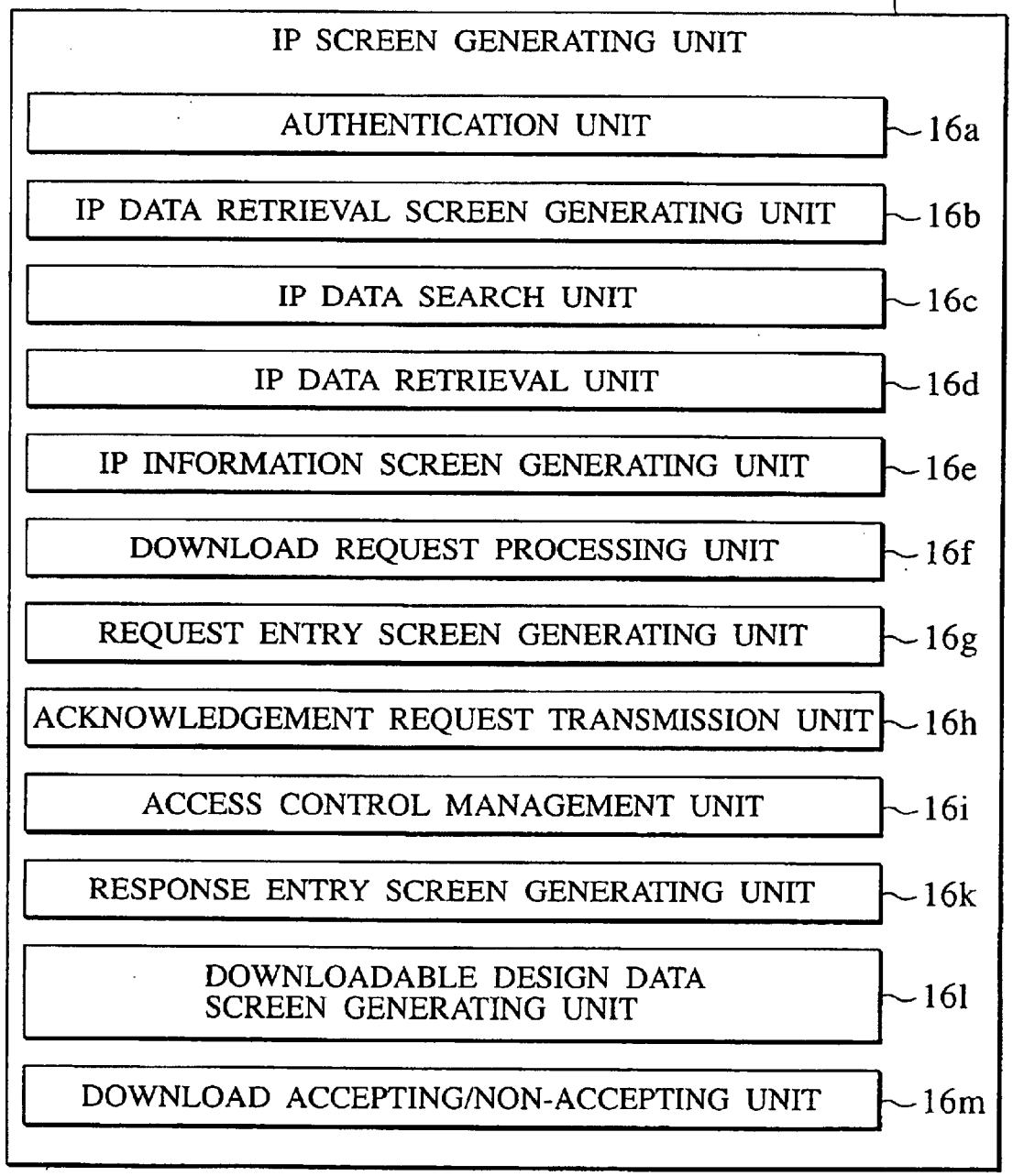
FIG. 23 is a block diagram showing the detailed configuration of an IP screen generating unit within the LSI manufacturing support server shown in FIG. 22.

FIG. 23 is a block diagram of the IP screen generating unit 16. This IP screen generating unit 16 is used when a user of IP design data uses IP design data stored in the IP management storage 26 incorporated in the server processing and control device (CPU) 11.

The IP screen generating unit 16 embraces an authentication unit 16a, an IP data retrieval screen generating unit 16b, an IP data search unit 16c, an IP data retrieval unit 16d, an IP information display screen generating unit 16e, a download request processing unit 16f, a request entry screen generating unit 16g, an acknowledgement request transmission unit 16h, an access control management unit 16i, a response entry screen generating unit 16k, a downloadable design data list screen generating unit 16l, and an availability processing unit 16m.

The authentication unit 16a compares an ID and password input by a user or information provider, who is attempting to download IP design data with, for example, the user terminal 5, with the ID and password registered, and performs authentication by determining if the input ID and password are valid. The IP data retrieval screen generating unit 16b generates an input-output screen for the information provider and user. The IP data search unit 16c searches for inputted search keywords for creating an item list fitting the search keywords. The IP data retrieval unit 16d retrieves IP information for user's selected items in an item list from the IP management storage 26. The IP information screen generating unit 16e generates information relating to IP (IP information) retrieved by the IP data retrieval unit 16d as an IP information screen. The download request processing unit 16f performs download request processing when download is requested from the user terminal 5. The request entry screen generating unit 16g generates a request entry screen (download request screen) transmitted to the user terminal 5 for input of items regarding what and under what conditions items are to be downloaded when there is an IP design data download request from the user terminal 5. The acknowledgement request transmission unit 16h transmits items that the user has input to the request entry screen via the user terminal 5 as acknowledgement request mail message to the information provider terminal 7. The access control management unit 16i manages and controls who can download IP design data based on the information provider's acceptance or rejection (non-acceptance) message transmitted from the information provider terminal 7. An acknowledgement request mail display screen generating unit 16j (not shown in the drawings) generates acknowledgement request message to be transmitted to the information provider terminal 7 from the contents of the request entry screen. The response entry screen generating unit 16k generates a response entry screen for the information provider to enter whether IP design data download is accepted or not accepted (refused), or another response related to the same vis-a-vis acknowledgement request message transmitted to the information provider terminal 7. The downloadable design data list screen generating unit 16l generates a downloadable design data list screen for selecting IP design data when the user downloads authorized IP design data to the user terminal 5 based on the response of the information provider that is transmitted from the information provider terminal 7. The availability processing unit 16m transmits a download acceptance message or download rejection message for informing of acceptance or rejection of a download to the user terminal 5 based on the response of the information provider that is transmitted from the information provider terminal 7.

Figure 24:
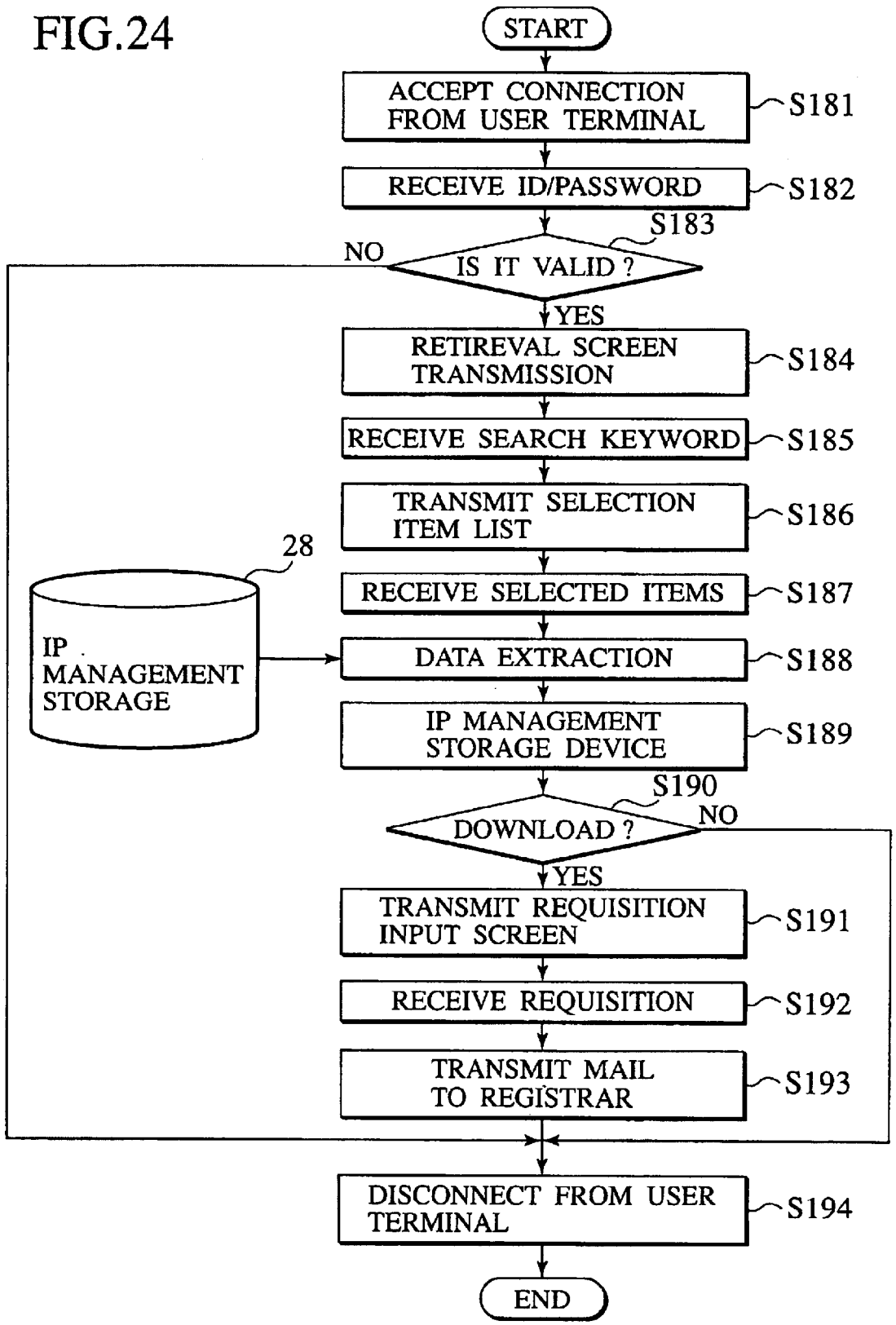
FIG. 24 is a flowchart showing the processing sequence of an LSI manufacturing support server in the case where a user requests download of IP design data according to the second embodiment of the present invention.

FIG. 24 is a flowchart for the server 1 on the occasion where a user uses IP design data in the IP management storage 26.

(a) First, in step S181, the server 1 accepts connection from the user terminal 5.

(b) Next, in step S182, the server 1 receives information such as an ID and password transmitted from the user terminal 5. Moreover, in step S183, the server 1 performs a check to determine whether the received ID and password are valid. The validity check performed at this point uses the authentication unit 16a shown in FIG. 23, and is carried out by comparing with the ID and password registered in the personal information storage 29. In the case where the received data is not valid, in step S194, the server 1 may either disconnect the user terminal 5 or again prompt the user terminal for input of ID, password, and/or similar information. In the case where the received data is valid, in step S184, the server 1 transmits an IP data retrieval screen. At this point, the IP data retrieval screen is generated through use of the IP data retrieval screen generating unit 16b shown in FIG. 23. In step S185, the server 1 receives from the user terminal 5 the search keyword that the user input (selected) in the IP data retrieval screen.

(c) Next, in step S186, the server 1, based on the search keyword, transmits the IP list corresponding to the retrieval results to the user terminal 5 as a selection item list using the IP data search unit 16c of FIG. 23. The user selects the desired IP from this selection item list. Then, in step S187, the server 1 receives information as to which IP was selected that is transmitted from the user terminal 5.

(d) Next, in step S188, the server 1 retrieves the selected IP information (information relating to IP) from the IP management storage 26. This retrieving process is carried out using the IP data retrieval unit 16d of FIG. 23. In step S189, the server 1 then transmits information relating to the retrieved IP (IP information) to the user terminal 5 as an IP information screen 135. An example of the IP information screen transmitted here is shown in FIG. 26. This IP information screen 135 is generated with the IP information screen generating unit 16e of FIG. 23.

(e) Next, in step S190, the server 1 determines whether IP design data download is being requested with the IP information screen 135 using the download request processing unit 16f of FIG. 23. In the case where IP design data is not being requested, in step S194, the server 1 disconnects the user terminal 5. In the case where IP design data download is being requested, in step S191, the server 1 transmits the request entry screen (download request screen) 136 used for determining download authorization to the user terminal 5. An example of the request entry screen transmitted here is shown in FIG. 27. This request entry screen 136 is a screen for entering what and under what conditions items should be downloaded, and is generated with the request entry screen generating unit 16g shown in FIG. 23. Then, in step S192, the server 1 receives the items transmitted from the user terminal 5.

Figure 31:
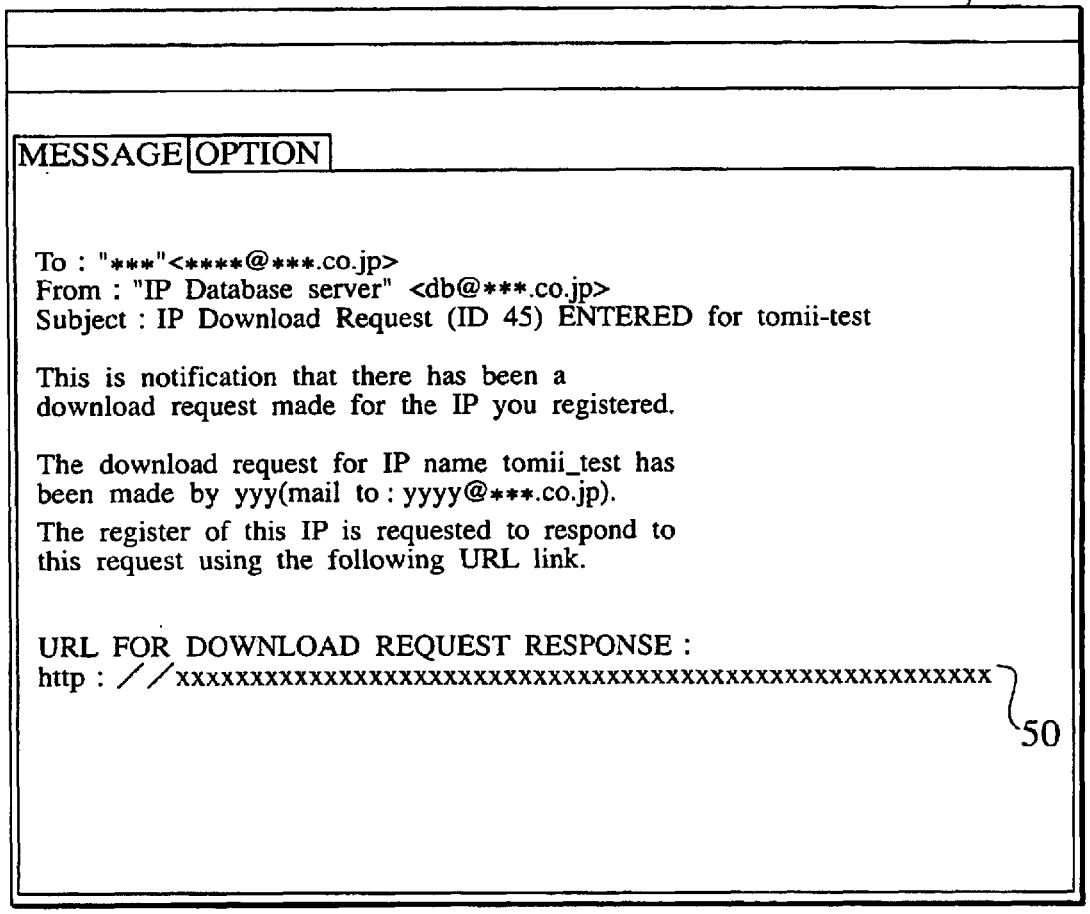
FIG. 31 is an example of an acknowledgement request e-mail sent to the information provider terminal according to the second embodiment of the present invention.

(f) Next, in step S193, the server 1 transmits the requisition transmitted from the user terminal 5 as acknowledgement request mail message 139A to the information provider using the acknowledgement request transmission unit 16h of FIG. 23, and in step S194, disconnects the user terminal. An example of the acknowledgement request mail message to be transmitted to the information provider from the server 1 is shown in FIG. 31.

Figure 25:
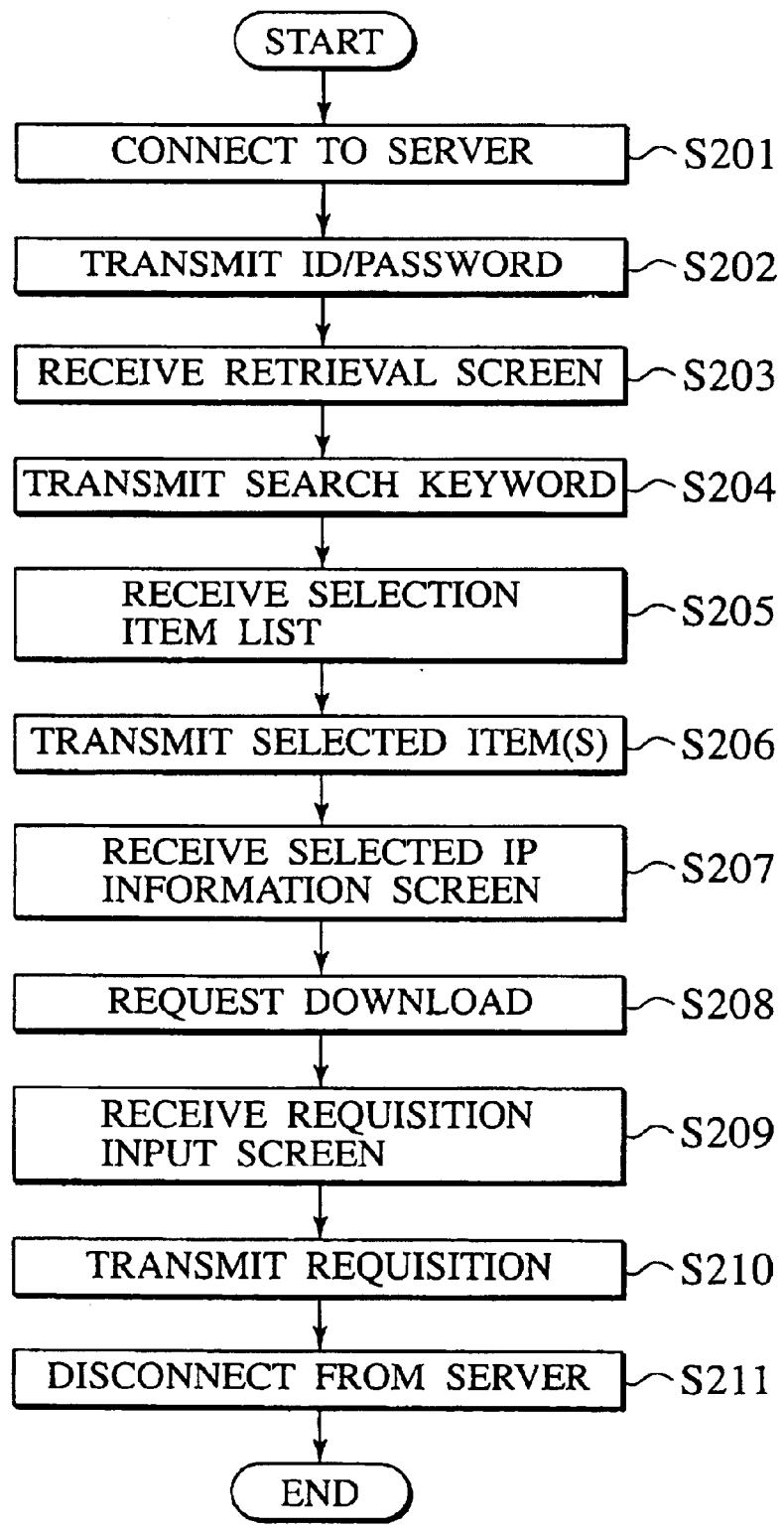
FIG. 25 is a flowchart showing the processing sequence of a user terminal corresponding to FIG. 24 in the case where a user requests download of IP design data according to the second embodiment of the present invention.

FIG. 25 is a flowchart for the user terminal 5 corresponding to FIG. 24 on the occasion where a user of IP design data attempts to use the IP design data in the IP management storage 26.

(a) First, corresponding to step S181 in FIG. 24, in step S201, the user terminal 5 connects to the server 1.

(b) Next, corresponding to step S182 in FIG. 24, in step S202, the user inputs identification information such as an ID and password into the user terminal 5, and the user terminal 5 transmits it to the server 1.

(c) Next, corresponding to step S184 in FIG. 24, in step S203, the user terminal 5 receives an IP data retrieval screen from the server 1.

(d) Next, corresponding to step S185 in FIG. 24, in step S204, the user inputs a search keyword into the IP data retrieval screen displayed on the user terminal 5, and the user terminal 5 transmits it to the server 1.

(e) Next, corresponding to step S186 in FIG. 24, in step S205, the user terminal 5 receives an IP design data list as the retrieval results in the form of an item list from the server 1.

(f) Corresponding to step S187 in FIG. 24, in step S206, the user selects the IP for which viewing is desired from the item list received by the user terminal, and the user terminal 5 transmits information regarding which IP the user selected to the server 1.

(g) Next, corresponding to step S189 in FIG. 24, in step S207, the user terminal 5 receives an IP information screen ("IP component homepage" screen) 135 corresponding to the selected IP from the server 1. The IP information screen 135 here is as shown in FIG. 26.

(h) Corresponding to step S190 in FIG. 24, in step S208, when there is IP design data the user wants to download as a result of viewing the IP information screen 135, the user terminal 5 transmits a download request to the server 1. In the second embodiment of the present invention, the user terminal 5 transmits the IP download request to the server 1 through the user clicking on a "download request" hyperlink 42 in the IP information screen 135 such as that shown in FIG. 26.

(i) Next, corresponding to step S191 in FIG. 24, in step S209, the user terminal 5 receives a request entry screen (download request screen) 136, which includes a form for requisition entry items, from the server 1. The request entry screen (download request screen) 136 is a screen for entering downloadable determination material such as that shown in FIG. 27. Then, corresponding to step S192 in FIG. 24, in step S210, the user terminal 5 transmits the requisition to the server 1.

(j) Next, corresponding to step S194 in FIG. 24, in step S211, the user terminal 5 disconnects the server 1.

FIG. 26 is the IP information screen generated in step S189 in FIG. 24, and is also the IP information screen 135 that the user terminal 5 receives in step S207 of FIG. 25. This IP information screen 135 contains items such as the IP name of the selected IP design data, the release name corresponding to the IP name, details of the IP, classification (technology name), the group name pertaining to the IP information provider (not in the figures), the address of the information provider, hyperlinks to detailed display, and hyperlinks to download requests. In addition, with the IP information screen 135, when the user requests authorization to download the IP design data for the IP information provider, the request entry screen 136 (download request screen) shown in FIG. 27 is transmitted to the user terminal 5 from the LSI manufacturing support server through clicking on the "download request" hyperlink 42. In the IP information screen 135, if the "Display details" hyperlink 43 is clicked, then the IP catalog information screen 137 showing that IP catalog information is transmitted to the user terminal 5 from the server 1. The IP catalog information screen 137 is shown in FIG. 28.

FIG. 27 is a request entry screen (download request screen) 136 for the user to enter as an authorization determination material, when the user requests authorization to download the IP design data for the IP information provider, and is an example of the screen the user terminal 5 receives in step S209 of FIG. 25. With this request entry screen 136, there is a comment space 44 provided and in this comment space 44, information may be entered such as the user's name, user's telephone number, user's e-mail address, the customer name for the project and the project name, the LSI application, the affiliation of the application technician and design technician, other business terms, and the LSI development schedule. By clicking the "Submit" button, the information entered in, for example, the comment space 44 is transmitted to the information provider.

FIG. 28 is an example of the IP catalog information screen displayed when the "display details" hyperlink 43 in the IP information screen 135 is clicked. This IP catalog information screen 137 is a screen that provides detailed information for information regarding IP data displayed in the IP information screen 135 such as power supply voltage, design rule, frequency, technical information such as mounting, schedule related information such as development schedule, price, and business terms such as support terms, in addition to general details such as IP name. In addition, links to files such as the design data related to what are called "deliverables" are attached as shown in FIG. 28. In addition, when there is RTL source code, documentation (manuals), and test vectors that may be provided, under the IP catalog information screen 137, the objects to be downloaded are displayed. This data is provided on a request basis.

Figure 29:
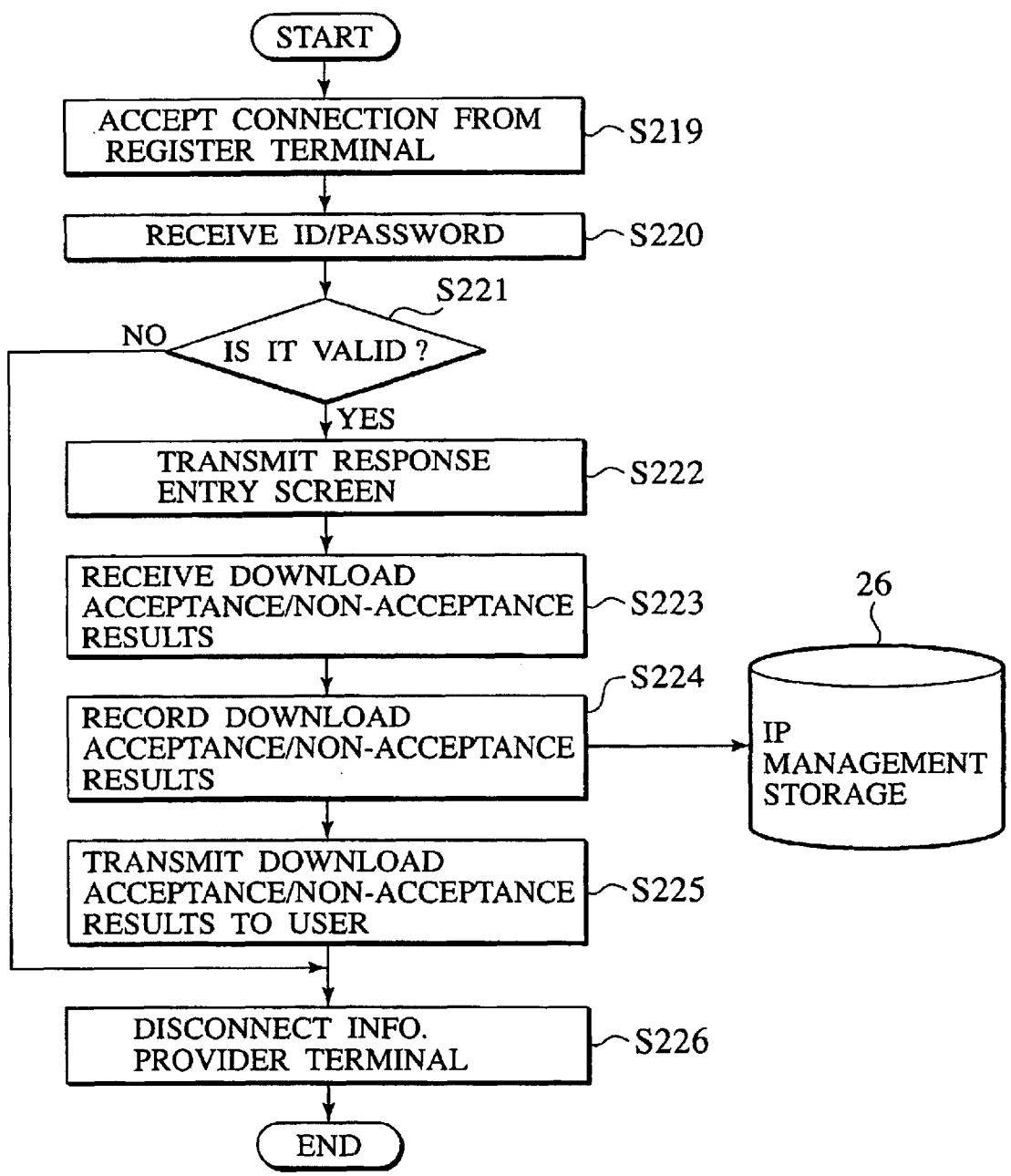
FIG. 29 is a flowchart showing the processing sequence of an LSI manufacturing support server in the case where an information provider accepts download of IP design data according to the second embodiment of the present invention.

Next, FIG. 29 is a flowchart of the server 1 when the IP information provider who receives acknowledgement request mail message either accepts or rejects the request through the information provider terminal 7.

(a) First, in step S219, the server 1 accepts connection from the information provider terminal 7.

(b) Next, in step S220, the server 1 receives information such as an ID and password transmitted from the information provider terminal 7. Moreover, in step S221, the server 1 performs a check to determine whether the received ID and password are valid. The validity check performed at this point uses the authentication unit 16a of FIG. 23, and is carried out by comparing the ID and password registered in the personal information storage 29 with the ID and password that are input. In the case where the received data is not valid, in step S226, the server 1 may either disconnect the information provider terminal 7 or again prompt the information provider terminal 7 for input of ID, password, and/or similar information. In the case where the received data is valid, the server 1 proceeds to the processing of step S222.

(c) Next, in step S222, the server 1 transmits response entry screen 140A to the information provider terminal 7. This response entry screen 140A is generated using the response entry screen generating unit 16k of FIG. 23. An example of the response entry screen 140A is shown in FIG. 32. The information provider inputs an acceptance or rejection message into the response entry screen 140A.

(d) Next, in step S223, the server 1 receives the results input to the response entry screen 140A from the information provider terminal 7. Then, in step S224, the server 1 stores the availability messages (download acceptance mail messages or download rejection mail messages) in the IP management storage 26 using the download request processing unit 16f of FIG. 23.

Figure 33:
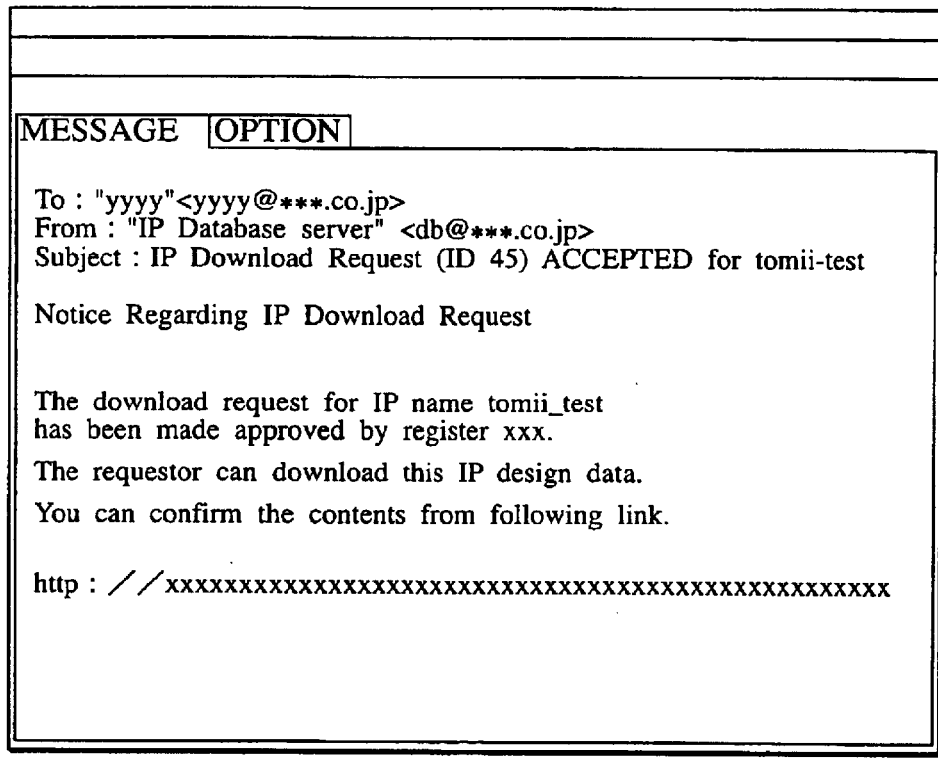
FIG. 33 is an example of a download acceptance e-mail sent to the user terminal according to the second embodiment of the present invention.
Figure 34:
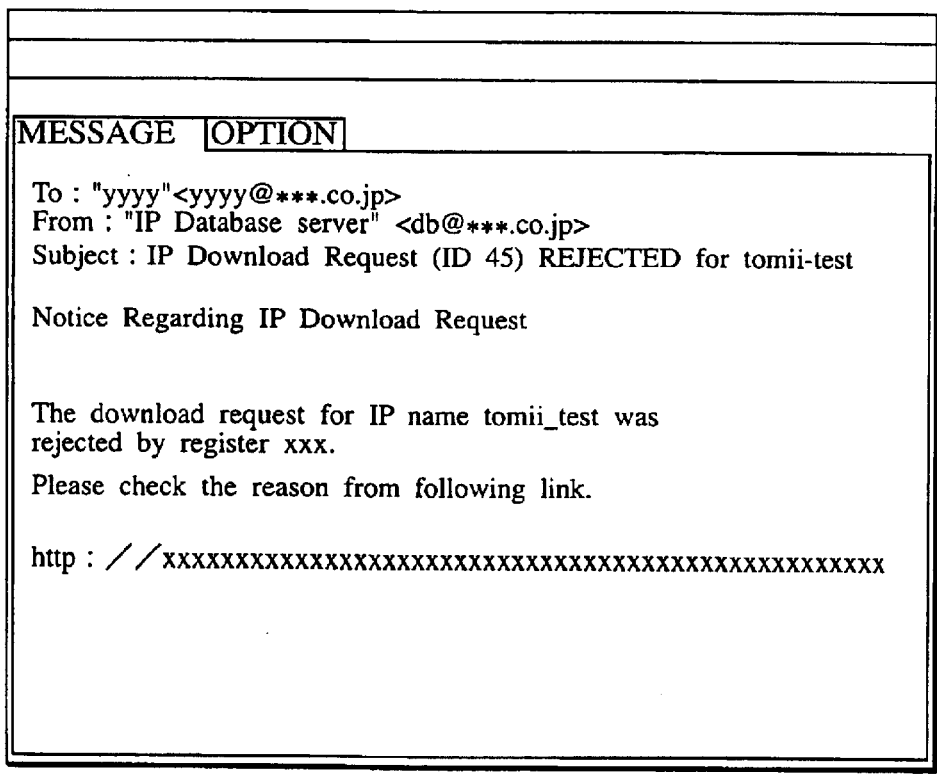
FIG. 34 is an example of a download rejection (non-acceptance) e-mail sent to the user terminal according to the second embodiment of the present invention.

(e) Next, in step S225, the server 1 transmits a download acceptance mail message 141 or download non-acceptance mail message (download rejection mail message) 142 to the user terminal 5 using the availability processing unit 16*m* of FIG. 23. For instance, in the case where download is accepted, a download acceptance mail message 141 such as that shown in FIG. 33 is transmitted as e-mail to the user terminal 5 by the server 1. In the case where download is not accepted, a download non-acceptance mail message (download rejection mail message) 142 such as that shown in FIG. 34 is transmitted as e-mail to the user terminal 5 by the server 1.

(f) Finally, in step S226, the server 1 disconnects the information provider terminal 7.

Figure 30:
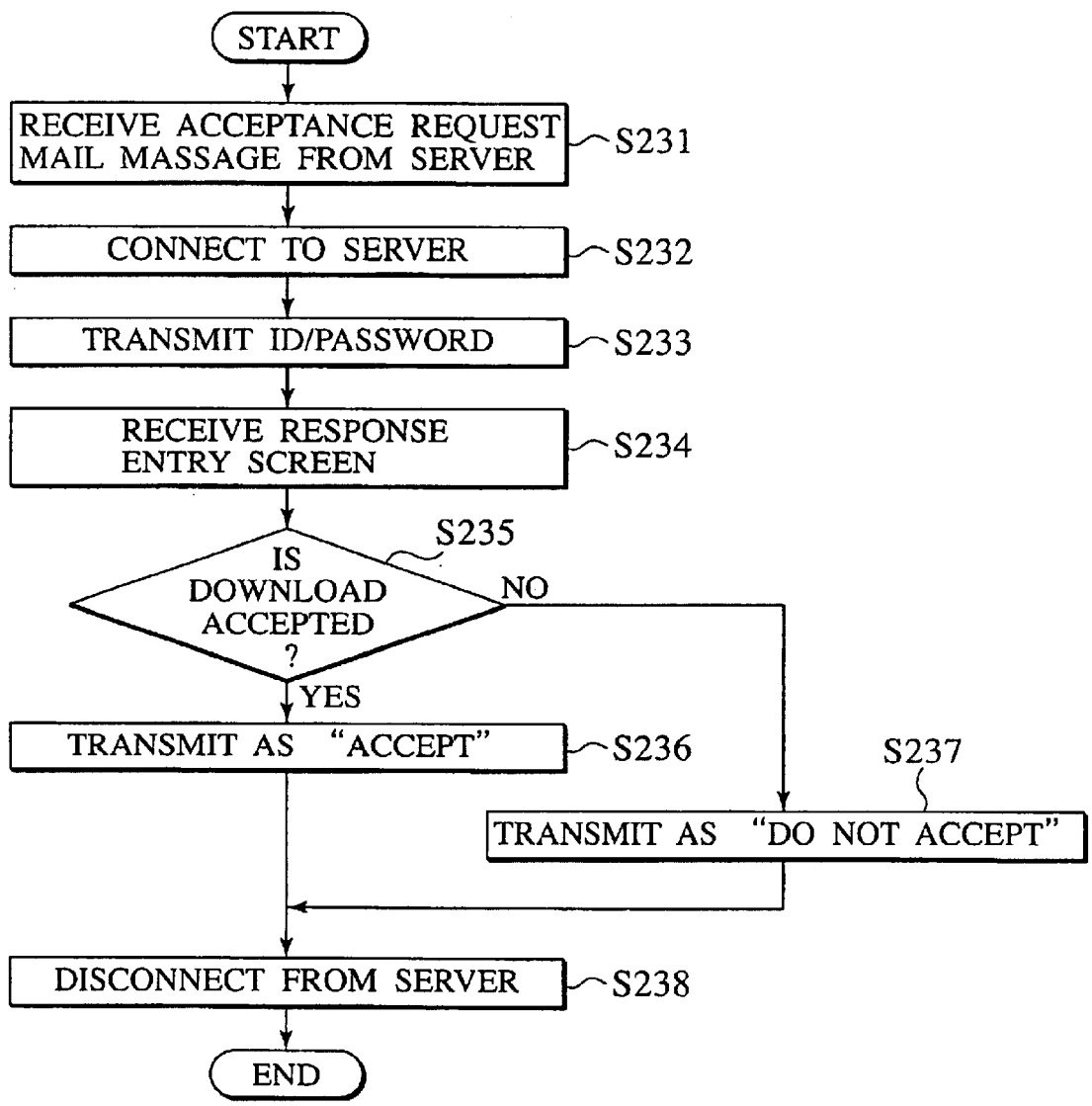
FIG. 30 is a flowchart showing the processing sequence of an information provider terminal corresponding to FIG. 29 in the case where an information provider accepts download of IP design data according to the second embodiment of the present invention.

FIG. 30 is a flowchart showing the processing sequence in the information provider terminal 7 when an IP information provider receives an acknowledgement request mail message with the information provider terminal 7 and accepts or rejects (does not accept) the IP design data download request.

(a) First, corresponding to step S193 in FIG. 24, in step S231 in FIG. 30, the information provider terminal 7 receives the acknowledgement request mail message 139A such as that shown in FIG. 31 from the server 1. An example of the acknowledgement request information to be transmitted at this point as e-mail to the information provider terminal 7 is shown in FIG. 32.

(b) Next, corresponding to step S219 in FIG. 29, in step S233, the information provider terminal 7 connects to the server 1.

(c) Next, corresponding to step S220 in FIG. 29, in step S232, the information provider inputs identification information such as an ID and password using the information provider terminal 7, and the information provider terminal 7 transmits the ID, password, and/or similar identification information to the server 1. Here, the information provider may input the identification information such as the ID and password into the information provider terminal 7 and have the information provider terminal 7 transmit it to the server 1, or the information provider may input the identification information such as the ID and password into the information provider terminal 7 beforehand and have the information provider terminal 7 automatically transmit the information provider identification information to the server 1.

(d) Next, corresponding to step S222 in FIG. 29, in step S234, the information provider terminal 7 receives the response entry screen 140A such as that shown in FIG. 33.

(e) Next, in step S235, the IP information provider determines in the response entry screen 140A displayed on the information provider terminal 7 whether or not to accept the download requested by the user. In step S223, in the case where download is then accepted, the IP information provider selects the item marked "accepted" in the response entry screen 140A and the information provider terminal 7 transmits the information selected by the information provider to the server 1. Alternatively, in the case where download is not accepted, the IP information provider selects "not accepted" in the response entry screen 140A in step S237 and the information provider terminal 7 transmits the information selected by the information provider to the server 1.

(f) Finally, corresponding to step S226 in FIG. 29, in step S238, the information provider terminal 7 disconnects the server 1.

FIG. 31 illustrates the contents of the acknowledgement request mail message 139A transmitted from the LSI manufacturing support server in S193 in FIG. 24 and received by the information provider terminal 7 in S231 in FIG. 30 when the user requests IP design data download. Information such as "who wants to download what IP design data" is written in the acknowledgement request mail message 139A received by the information provider terminal 7. The contents of the acknowledgement request input to the request entry screen (download request screen) 136 that the user receives in the user terminal 5 are displayed in this acknowledgement request mail message 139A. Within the body of the acknowledgement request mail message 139A according to the second embodiment of the present invention, a hyperlink 50 to the response entry screen 140A for responding to an acknowledgement request that the IP information provider receives in the information provider terminal 7 is displayed as a Universal Resource Locator (URL). FIG. 32 shows a display example of the response entry screen (edit request screen) 140A.

The response entry screen 140A shown in FIG. 32 is transmitted from the server 1 in step S222 in FIG. 29, and received by the information provider terminal 7 in step S234 in FIG. 30. First, a request ID, data reception date, who requested it, acceptant name, and update history are listed in this response entry screen 140A. The request ID here is a number given to each download acknowledgement request. The data reception date is the date on which the user transmitted what and under what conditions download was desired to the server 1 via the user terminal 5 in order for the user to request a download. "Requested By" is the person, for example a user, making the download request. The IP name is the name of the IP requested for download. From the request status item 51 formatted as a drop-down list, "Accepted" is selected when download is to be accepted, and "Not Accepted" is selected when download is not to be accepted. In addition, in the space for details 53 that is formatted as a text box, when download is authorized, the information provider may enter notes, etc., on usage of the IP design data. Otherwise, when download is not authorized, the reason for rejection, how the user should proceed, and the like, should be entered. Then, once the information provider clicks the "Submit" button 56, the information provider terminal 7 transmits the acceptance or rejection information to the server 1.

FIG. 33 is a display example of a download acceptance mail message transmitted to the user terminal 5 from the server 1, in the case where download is accepted by the information provider using the response entry screen 140A of FIG. 32. In this download acceptance mail message 141, information on "who accepted what" is entered first. In addition, as with the example of FIG. 32, a hyperlink 59 is attached to the acceptance information screen displaying information accepted by the IP information provider. Then, the acceptance information screen may be referenced by clicking on the hyperlink 59.

FIG. 34 is a display example of a download rejection mail message transmitted to the user terminal 5 from the server 1 in the case where download is rejected by the information provider through the response entry screen 140A of FIG. 32. In this download rejection mail message 142, as with FIG. 33, information on "who rejected what" is entered first. In addition, as with the examples of FIG. 31 and FIG. 33, a hyperlink 61 is attached to the rejection information screen displaying information on the reason for rejection by the IP information provider. The rejection information screen may then be referenced by clicking on the hyperlink 61. In the case where a download request is rejected, the user should submit another request in accordance with the instructions of the IP information provider to whom the request was made.

Figure 35:
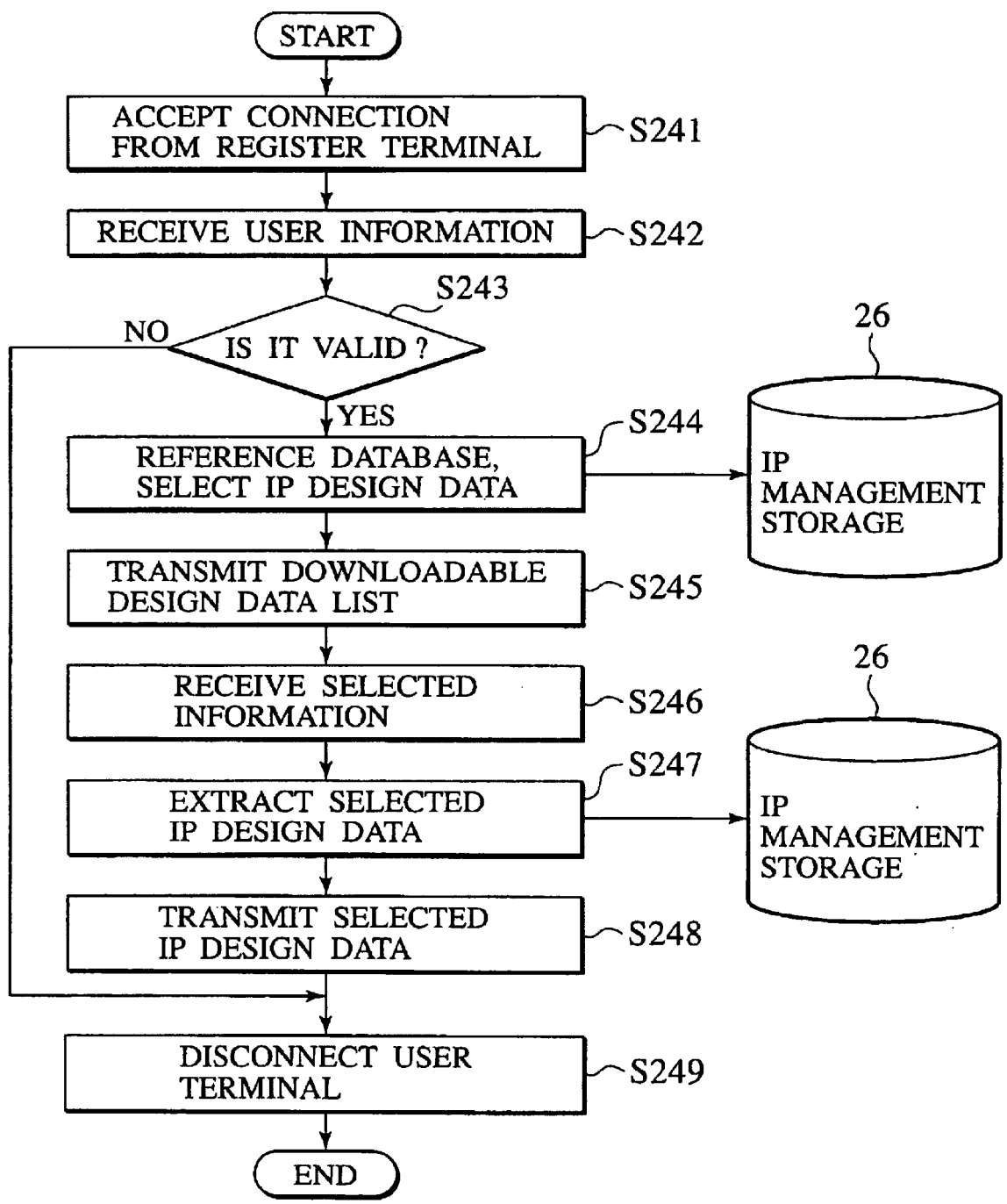
FIG. 35 is a flowchart showing the processing sequence of an LSI manufacturing support server in the case where accepted IP design data is downloaded according to the second embodiment of the present invention.

Next, FIG. 35 is a flowchart for the server 1 on the occasion where a download request is accepted by the information provider, and a user downloads IP design data.

(a) First, in step S241, the server 1 accepts connection from the user terminal 5.

(b) Next, in step S242, the server 1 receives user information such as an ID and password transmitted from the user terminal 5. Moreover, in step S243, the server 1 performs a check to determine whether the received ID and password are valid. The validity check performed at this point uses the authentication unit 16a of FIG. 23, and is carried out by comparing the ID and password registered in the personal information storage 29 with the ID and password that are input. In the case where the received data is not valid, in step S249, the server 1 may either disconnect the user terminal 5 or again prompt the user terminal 5 for input of ID, password, and/or similar user information. In the case where the received data is valid, the server 1 proceeds to the processing of step S244.

Figure 37:
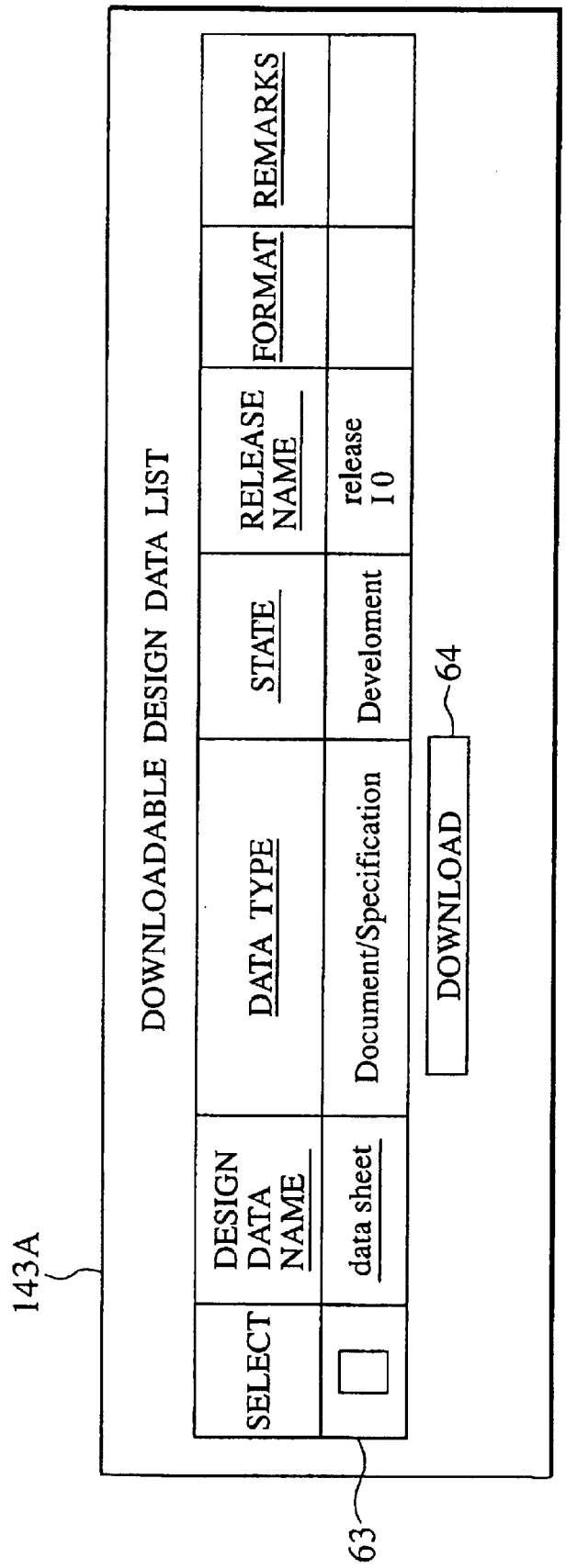
FIG. 37 is a display screen example for displaying on a user terminal a downloadable design data list screen according to the second embodiment of the present invention.

(c) Next, in step S244, the server 1, based on the user information, retrieves the IP the user has been given authorization to download by the IP information provider using the IP data retrieval unit 16d shown in FIG. 23. In step S245, the server 1 then transmits the IP design data selection items to the user terminal 5 as a downloadable design data list screen 143A using the download request processing unit 16f shown in FIG. 23. A display example of the downloadable design data list screen 143A to be transmitted at this point to the user terminal 5 is shown in FIG. 37. This downloadable design data list screen 143A is generated by the downloadable design data list screen generating unit 161 shown in FIG. 23.

(d) Next, in step S246, the server 1 receives IP design data selection information in the downloadable design data list screen 143A shown in FIG. 37 that the user wishes to download.

(e) Next, in step S247, the server 1 retrieves the IP design data corresponding to that selection information from the IP management storage 26 using the IP data retrieval unit 16d of FIG. 23. Then, in step S248, the server 1 transmits the retrieved IP design data to the user terminal 5.

Figure 36:
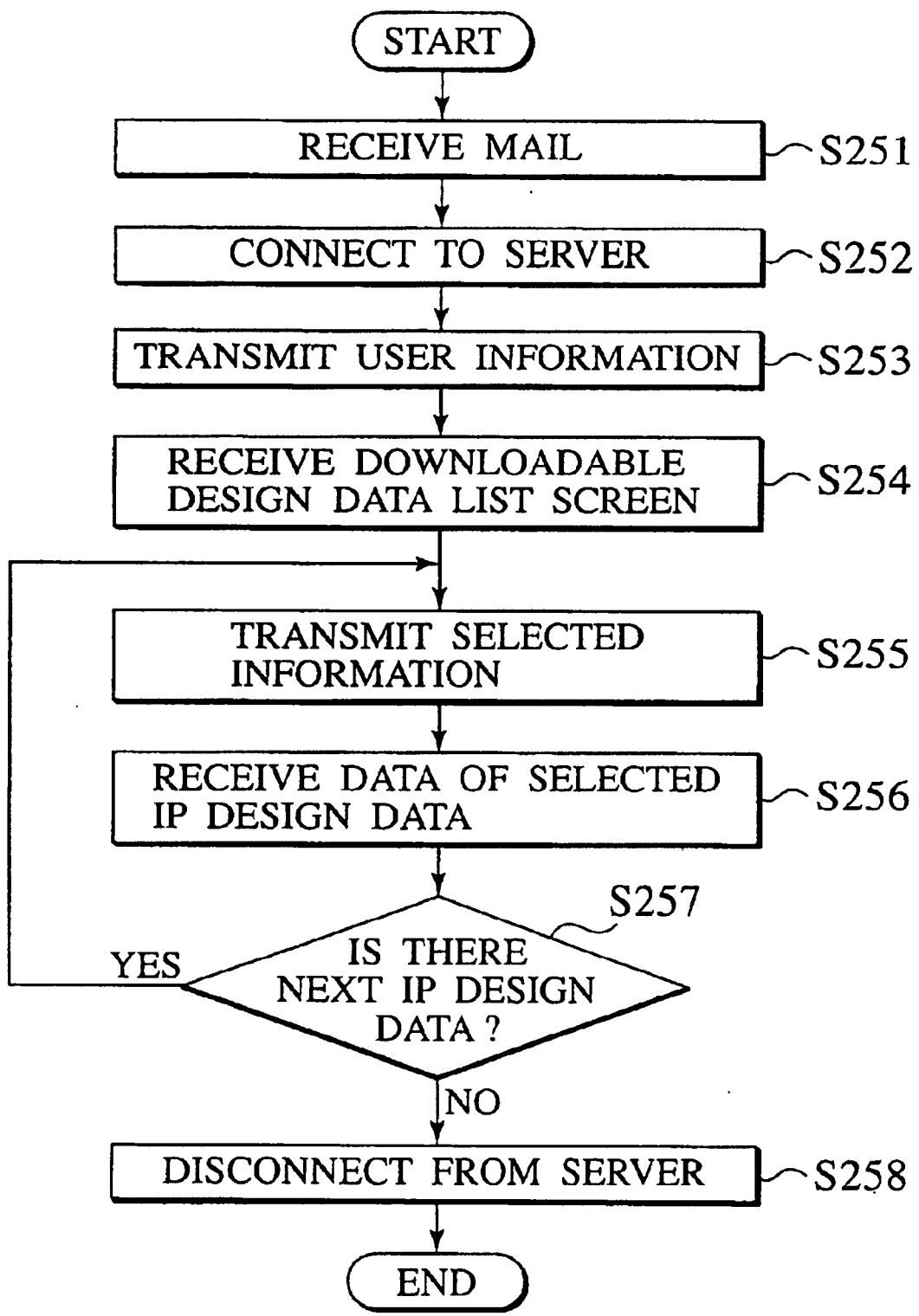
FIG. 36 is a flowchart showing the processing sequence of a user terminal corresponding to FIG. 35 in the case where accepted IP design data is downloaded according to the second embodiment of the present invention.

Next, FIG. 36 is a flowchart corresponding with that in FIG. 35, for the user terminal 5 on the occasion where a download request is accepted by the information provider, and a user downloads IP design data.

(a) First, corresponding to step S225 in FIG. 30, in step S251 in FIG. 36, the user terminal 5 receives the download acceptance mail message shown in FIG. 33 from the server 1.

(b) Next, corresponding to step S241 in FIG. 35, in step S252, the user terminal 5 connects to the server 1. Then, corresponding to step S242, in step S253, the user terminal 5 transmits the user information to the server 1.

(c) Next, corresponding to step S245 in FIG. 35, in step S254, the user terminal 5 receives the downloadable design data list screen 143A shown in FIG. 37.

(d) Next, corresponding to step S246 in FIG. 35, in step S255, the user selects the specifications and desired IP design data to be downloaded from the items in the downloadable design data list screen 143A shown in FIG. 37, and the user terminal 5 transmits the selected information to the server 1.

(e) Next, corresponding to step S248 in FIG. 35, in step S256, the user terminal 5 downloads the selected specifications and IP design data from the server 1.

(f) Finally, corresponding to step S249 in FIG. 35, in step S258, the user terminal 5 disconnects the server 1.

FIG. 37 is a display example of the downloadable design data list screen 143A transmitted from the server 1 in step S245 in FIG. 35 and received by the user terminal 5 in step S254 in FIG. 36. Corresponding to step S181 in FIG. 24, in step S201 in FIG. 25, once the user terminal 5, having received the download acceptance mail message 141 such as that shown in FIG. 33, again accesses the server 1, the downloadable design data list screen 143A shown in FIG. 37 is transmitted from the server 1 to the user terminal 5, allowing the user to view the downloadable design data list screen 143A. Furthest to the left hand side of FIG. 37, there is a "select" field that allows the IP design data that the user wishes to download to be selected. Specification items for the respective sets of IP design data are listed here, including "design data name", "data type", "status", "release name", "format", and "remarks". The user then selects the check box 63 in the "select" field of the IP design data s/he wishes to download in the downloadable design data list screen 143A shown in FIG. 37, and once the user has clicked the "download" button 64, may begin downloading the IP design data to the user terminal 5.

Modification of the Second Embodiment

According to the second embodiment of the present invention, the acknowledgement request mail message 139A shown in FIG. 31 may be such as the acknowledgement request mail message 139B shown in FIG. 38. The acknowledgement request mail message 139B shown in FIG. 38 displays a list of IP design data, which is requested for download by a user, as information for specifying the user who requests the download, in addition to a user's name, a user's contact address (telephone number, fax number, etc.), and an e-mail address.

This acknowledgement request mail message 139B is then transmitted to an information provider terminal 7 as a response entry screen 140B such as that shown in FIG. 39, instead of the response entry screen 140A of FIG. 32. With the information provider terminal 7, authorized, "O" (a circle), or not-authorized, "X" is entered in authorization check boxes 70a through 70c in the response entry screen 140B, and it is transmitted to the server 1.

The transmitted response entry screen 140B is received by the server 1, and is transmitted to the user terminal 5 as a downloadable design data list screen 143B as shown in FIG. 40. In the downloadable design data list screen 143B shown in FIG. 40, authorized items are listed with an "O" (a circle) added to the authorization check boxes 70a through 70c in the response entry screen 140B. If a checks are added to the selection boxes 70a and 70b and the downloadable design data list screen 143B transmitted to the server 1, a user may download checked IP design data with the user terminal 5.

Other Embodiments

As mentioned above, the present invention is described according to the first and second embodiments, however, the hyperlinks attached to the body of e-mail in the examples of, for example, FIG. 32, FIG. 36, and FIG. 37 may not function as a hyperlink depending on the mailer used. In this case, since a URL is denoted as a hyperlink, it is possible to gain access with the denoted URL. In addition, the vertical axis and horizontal axis of the matrix in FIG. 21 may certainly be exchanged with each other.

In step S224 through step S228 in FIG. 30, when the information provider responds to the IP design data download request from the user, as disclosed in the second embodiment of the present invention, the information provider may input data via the information provider terminal 7 into the input screen provided by the server 1, and have the data received through the server 1, or the information provider may respond using, for example, e-mail. Which method is used does not matter as long as the information provider can respond to the download acknowledgement request from the user.

With the above-mentioned first and second embodiments, the IP management information consisting of IP design data and IP development schedule data is stored in the IP management storage 26. In addition, through the data acquisition unit 13a shown in FIG. 3b, data regarding IP development schedule data from the IP management information stored in the IP management storage 26 may be stored in the IP development schedule storage 27, and used in the first and second embodiments. However, the server 1 may have either one of the IP management storage 26 or IP development schedule storage 27. In such a case then, the data acquisition unit 13 and IP schedule data updating unit 13b in the IP development schedule information processing unit 13 is not required to be included in the CPU 11 of the server 1.

Figure 41:
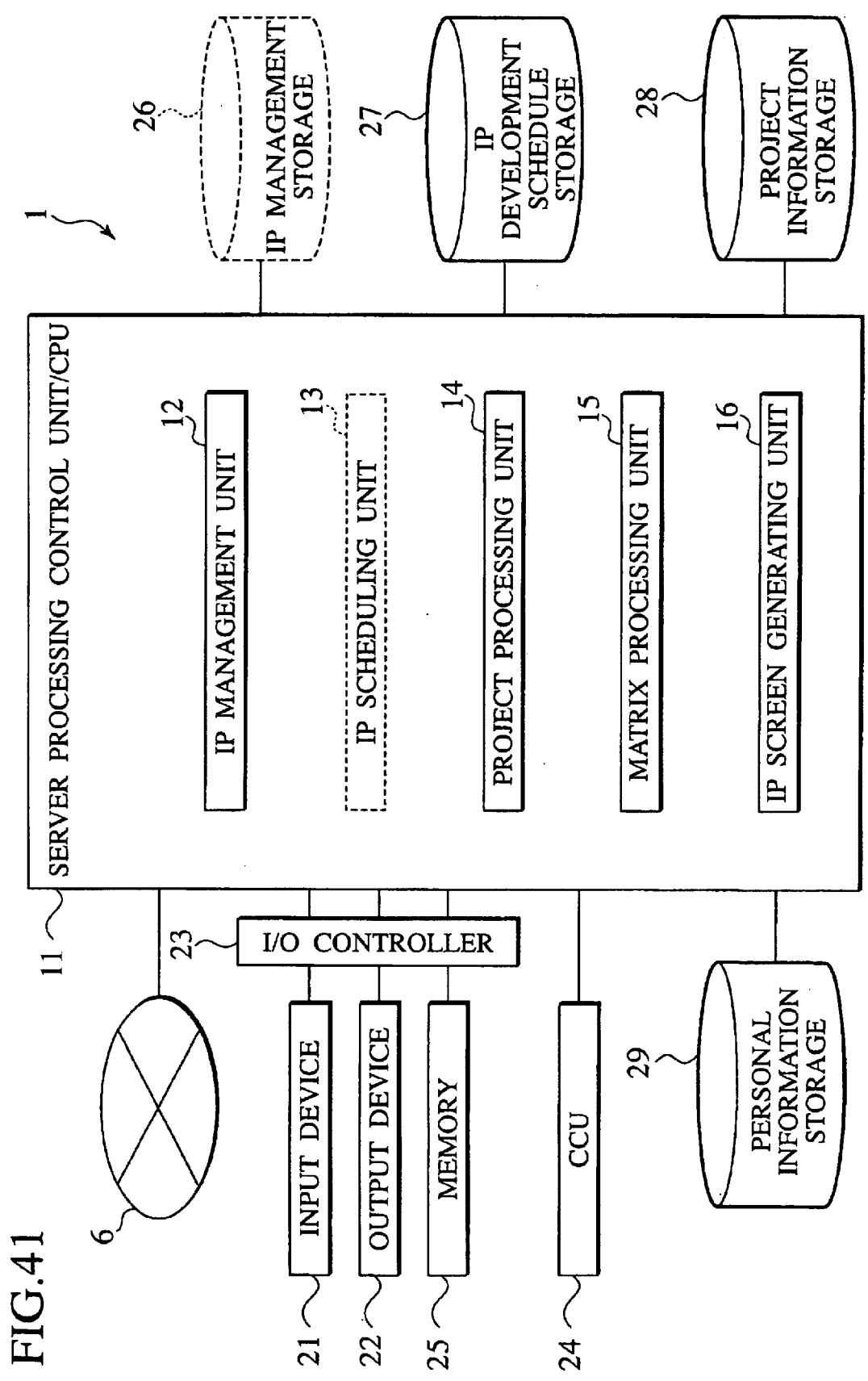
FIG. 41 is a block diagram showing the configuration of an LSI manufacturing support server according to other embodiment of the present invention.

In other words, as shown in FIG. 41, the server 1 according to the first and second embodiments of the present invention may encompasses an input device 21, output device 22, input-output control device 23, communications control device 24, main memory 25, IP development schedule storage 27, project information storage 28, personal information storage 29, and server processing and control device (CPU) 11. In addition, the CPU 11 may embraces an IP management unit 12, project processing unit 14, matrix processing unit 15, and IP screen generating unit 16.

FIG. 42 is a flow chart for the server 1 on the occasion where an IP developer registers IP management information into the IP development schedule storage 27 when the server 1 does not have an IP management storage 26, shown in FIG. 2.

(a) First, in step S300, the server 1 accepts connection from the IP developer terminal 3.

(b) Next, in step S301, the server 1 receives ID and password transmitted from the IP developer terminal 3. Moreover, in step S302, the server 1 determines whether the received data is valid. At this point, the validity check is performed using the IP authentication unit 12a of FIG. 2, and is carried out by comparing the ID and password registered into the personal information storage 29 with the ID and password that were transmitted. In the case where the received data is not valid, in step S308, the server 1 may either disconnect the IP developer terminal 3 or again prompt the IP developer terminal 3 for input of ID, password, and similar information. In the case where the received data is valid, in step S303, the server 1 transmits an IP data entry screen to the IP developer terminal 3. Here, the IP data entry screen transmitted to the IP developer terminal 3 is generated using the IP data entry screen generating unit 12b of FIG. 3A.

(c) Thereafter, the server 1, in step S304, receives IP data, at least including an IP development schedule, from the IP developer terminal 3, which is an input to the IP data entry screen transmitted in step S303. In step 305, the server 1 determines whether the received data is new data or data to be updated. When it is new data, process proceeds to step S306. When it is data to be updated, process proceeds to step S307.

(d) In step S305, if it is determined that it is new IP data, then in step S306, the server 1 stores the received IP data in the IP development schedule storage 27 by using the IP data registration unit 12c of FIG. 3A. If it is determined that IP data needs to be updated, then in step S307, the server 1 updates data stored in the IP development schedule storage 27 by using the IP data updating unit 12d of FIG. 3A the information already stored in the IP development schedule storage 27 with the updating information.

(e) Finally, in step S308, the server 1 disconnects the IP developer terminal 3.

Although the embodiments of the present invention have been described in detail, the invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A server for use in a system for large scale integration manufacturing, the system comprises a communication line, a server connected to the communication line, IP developer terminals connected to the communication line. LSI developer terminals connected to the communication line, an IP management storage connected to the communication line, a development schedule storage connected to the server; and a project information storage connected to the server, the server comprising:

an IP management unit, configured to manage IP management information stored in the IP management storage;

an IP scheduling unit, configured to process IP development schedule stored in the development schedule storage;

a project processing unit, configured to process information regarding a LSI development project, stored in the project information storage; and a matrix processing unit, configured to evaluate availability of the IPs in time span by using a relative temporal relationship between development schedule of the IPs and the project information, and expressing the evaluation result in a matrix form.

2. The server of claim 1, wherein the IP management unit comprising:

an IP registration unit, configured to register the IP management information, having IPs and development schedules of the IPs in the IP management storage; and an IP updating unit, configured to update the IP management information stored in the IP management storage.

3. The server of claim 1, wherein the IP scheduling unit comprising:

a data acquisition unit, configured to retrieve a certain development schedule of the IP from the IP management information stored in the IP management storage, and sending the retrieved development schedule into the development schedule storage; and a schedule data updating unit, configured to update the development schedule stored in the development schedule storage.

4. The server of claim 1, wherein the project processing unit comprising:
   a project data registration unit, configured to register project information including the project schedule data into the project information storage; and
   a project data updating unit, configured to update the project information stored in the project information storage.

5. The server of claim 1, wherein the matrix processing unit comprising:
   an IP retrieving unit, configured to retrieve the development schedule of the IPs from the development schedule storage;
   a project retrieving unit, configured to retrieve the project schedule data from the project information storage;
   a schedule data evaluation unit, configured to evaluate availability of the IPs in time span by using a relative temporal relationship between the retrieved development schedule of the IPs and the retrieved project schedule data; and
   an evaluation result display unit, configured to display and matrixising the evaluation result on an intersection of a first and a second axis of a matrix, wherein names of the IPs corresponding to the development schedule of the IPs on the first axis and project schedule data corresponding to the project schedule data on the second axis.

6. A server for use in a system for large scale integration manufacturing, the system comprises a communication line, a server connected to the communication line, user terminals connected to the communication line, information provider terminals connected to the communication line, and an IP management storage connected to the server, the server comprising:
   an IP management unit, configured to manage IP management information stored in the IP management storage; and
   a screen generating unit, configured to receive an acknowledgement request for downloading IPs stored in the IP management storage from the user terminals, and to transmit availability messages of the IPs to the information provider terminals.

7. The server of claim 6, wherein the IP management unit comprising:
   an IP registration unit, configured to register the IP management information, having IPs and the development schedules of the IPs in the IP management storage; and
   an IP updating unit, configured to update the IP management information stored in the IP management storage.

8. The server of claim 6, wherein the screen generating unit comprising:
   an IP information screen generating unit, configured to retrieve specified IPs corresponding to a search keyword from the IP management storage mud generating an IP information screen displaying the specified IPs;
   an acknowledgement request transmission unit, configured to transmit the acknowledgement request received from the user terminals to the information provider terminals;
   a response entry screen generating unit, configured to generate a response entry screen for entering a response to the acknowledgement request from the information provider terminals;
   an availability processing unit, configured to transmit the response to the user terminals for imparting the availability message; and
   an access control management unit, configured to control download access from the user terminals according to the availableness message from the information provider terminals.

9. A server for use in a system for large scale integration manufacturing, the system comprises a communication line, a server connected to the communication line, IP developer terminals connected to the communication line, LSI developer terminals connected to the communication line, an IP management storage connected to the server, and a project information storage connected to the server, the server comprising:
   an IP management unit, configured to manage IP management information, at least including development schedule of the IP stored in the IP management storage;
   a project processing unit, configured to process information regarding LSI development projects, stored in the project information storage; and
   a matrix processing unit, configured to evaluate availability of the IP in time span by using a relative temporal relationship between the development schedule of the IP and the project information, and expressing the evaluation result in a matrix form.

10. The server of claim 9, wherein the IP management unit comprising:
    an IP registration unit, configured to register the IP management information including IPs and the development schedules of the IPs in the development schedule storage; and
    an IP updating unit configured to update the development schedules of the IPs stored in the development schedule storage.

11. The server of claim 9, wherein the project processing unit comprising:
    a project data registration unit, configured to register project information including the project schedule data into the project information storage; and
    a project data updating unit, configured to update the project information stored in the project information storage.

12. The server of claim 9, wherein the matrix processing unit comprising:
    an IP retrieving unit, configured to retrieve the development schedule of the IP flare the development schedule storage;
    a project retrieving unit, configured to retrieve the project schedule data from the project information storage;
    a schedule data evaluation unit, configured to evaluate availability of the IPs in time span by using a relative temporal relationship between the retrieved development schedules of the IPs and the retrieved project schedule data; and
    an evaluation result display unit, configured to display and matrixise the evaluation result on an intersection of a first and a second axis of a matrix, wherein IP names corresponding to the development schedules of the IPs on the first axis and project schedule data corresponding to the project schedule data on the second axis.

13. A computer implemented method for large scale integration comprising:

retrieving development schedule of an IPs from a development schedule storage;

retrieving projects' schedule data from a project information storage;

evaluating availability of the IPs by using a relative temporal relationship between the retrieved development schedules of the IPs and the retrieved projects' schedule data; and generating a matrix showing the evaluation result on an intersection of a first and a second axis of the matrix, wherein names of the IPs corresponding to the development schedule of the IPs on the first axis and the project schedule data corresponding to the projects' schedule data on the second axis.

14. The method of claim 13, further comprising:

storing IP management information including IPs and the development schedules of the IPs into an IP management storage;

retrieving a certain development schedules of the IPs from the IP management information stored in the IP management storage; and storing the retrieved development schedules of the IPs into the development schedule storage.

15. The method of claim 13, further comprising:

storing IP management information including IPs and the development schedules of the IPs in the development schedule storage.

16. The method of claim 13, further comprising:

storing the project information including the projects' schedule data in the project information storage.

17. A computer implemented method for large scale integration manufacturing comprising:

storing IPs in an IP management storage;

receiving a download request for an IP being stored in the IP management storage;

transmitting the download request to an information provider terminal as a request notification message;

receiving an availability message regarding the request notification message from the information provider terminal;

transmitting the availability message to an user terminal; and downloading the IP from the IP management storage to the user terminal.

18. A computer program product for use in a system for large scale integration manufacturing, the system comprises a communication line, a server connected to the communication line, LSI developer terminals connected to the communication line, user terminals connected to the communication line, an IP management storage connected to the communication line, a development schedule storage connected to the server, a project information storage connected to the server, and a storage medium connected to the server, the computer program product comprising:

instructions embodied within the storage medium for retrieving development schedule of the IP from the development schedule storage;

instructions embodied within the storage medium for retrieving project schedule data from the project information storage;

instructions embodied within the storage medium for evaluating availability of the IPs by using a relative temporal relationship between the retrieved development schedules of the IPs and the retrieved project schedule data; and instructions embodied within the storage medium for displaying and matrixing the evaluation result on an intersection of a first and a second axis of a matrix, wherein IP names corresponding to the development schedules of the IPs on the first axis and project schedule data corresponding to the project data on the second axis.

19. The computer program product of claim 18, further comprising:

instructions embodied within the storage medium for storing IP management information including IPs and the development schedules of the IPs into an IP management storage;

instructions embodied within the storage medium for retrieving a certain development schedules of the IPs from the IP management information stored in the IP management storage; and instructions embodied within the storage medium for storing the retrieved development schedules of the IPs into the development schedule storage.

20. A computer program product for use in a system for large scale integration manufacturing, the system comprises a communication line, a server connected to the communication line, an user terminal connected to the communication line, an information provider terminal connected to the communication line, an IP management storage connected to the server, a development schedule storage connected to the server, a project information storage connected to the server, and a storage medium connected to the server, the computer program product comprising:

instructions embodied within the storage medium for storing IP in the IP management storage;

instructions embodied within the storage medium for transmitting an IP information screen regarding specified IPs corresponding to a search keyword to the user terminal;

instructions embodied within the storage medium for transmitting an acknowledgement request for downloading the IP to the information provider terminal;

instructions embodied within the storage medium for displaying a response entry screen corresponding to the acknowledgement request;

instructions embodied within the storage medium for transmitting availability message from the information provider terminal to the user terminal; and instructions embodied within the storage medium for downloading the IP in accordance with a request from the user terminal.

* * * * *